United States Patent
Nate

(10) Patent No.: US 10,014,785 B2
(45) Date of Patent: Jul. 3, 2018

(54) INSULATION TYPE SWITCHING POWER SOURCE APPARATUS

(71) Applicant: Rohm Co., Ltd., Kyoto (JP)

(72) Inventor: Satoru Nate, Tokyo (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/347,952

(22) Filed: Nov. 10, 2016

(65) Prior Publication Data

US 2017/0063244 A1 Mar. 2, 2017

Related U.S. Application Data

(62) Division of application No. 14/506,763, filed on Oct. 6, 2014, now Pat. No. 9,590,511.

(30) Foreign Application Priority Data

| Oct. 8, 2013 | (JP) | ................................. 2013211279 |
| Nov. 7, 2013 | (JP) | ................................. 2013231093 |

(51) Int. Cl.
*H02M 3/335* (2006.01)
*H02M 1/36* (2007.01)
*H02M 1/00* (2006.01)

(52) U.S. Cl.
CPC ......... *H02M 3/33523* (2013.01); *H02M 1/36* (2013.01); *H02M 2001/0009* (2013.01);
(Continued)

(58) Field of Classification Search
CPC ............... H02M 3/33523; H02M 1/36; H02M 2001/0009; H02M 2001/0025;
(Continued)

(56) References Cited

U.S. PATENT DOCUMENTS

2008/0043496 A1* 2/2008 Yang ................. H02M 3/33507 363/21.12
2008/0089100 A1 4/2008 Park et al.
(Continued)

FOREIGN PATENT DOCUMENTS

JP 2005-261128 9/2005
JP 2010-063304 3/2010
(Continued)

OTHER PUBLICATIONS

Japanese Patent Office; Office Action dated Jul. 25, 2017 in corresponding Japanese Application No. 2013-212279, with English-language translation (8 pages).

*Primary Examiner* — Gustavo Rosario Benitez
(74) *Attorney, Agent, or Firm* — Fish & Richardson P.C.

(57) ABSTRACT

A power source apparatus comprises: a transformer that insulates a primary system and a secondary system and uses primary/secondary windings to transform an input voltage into an output voltage; a switching control device that is disposed in the primary system to drive the primary winding, and an output monitor device that is disposed in the secondary system to monitor the output voltage. The transformer includes a first auxiliary winding disposed in the primary system and a second auxiliary winding disposed in the secondary system. The output monitor device drives the second auxiliary winding to generate an induced voltage in the first auxiliary winding when the output voltage becomes smaller than a predetermined threshold voltage. The switching control device temporarily stops driving of the first winding upon detecting a light load state and resumes the driving of the first winding upon detecting the induced voltage in the first auxiliary winding.

7 Claims, 21 Drawing Sheets

(52) U.S. Cl.
CPC ............... *H02M 2001/0025* (2013.01); *H02M 2001/0032* (2013.01); *H02M 2001/0035* (2013.01); *Y02B 70/16* (2013.01)

(58) Field of Classification Search
CPC . H02M 2001/0032; H02M 2001/0035; H02M 3/33507; H02M 3/33515; H02M 1/08; H02M 3/33546; H02M 3/335; H02M 3/33553; Y02B 70/16
See application file for complete search history.

(56) References Cited

U.S. PATENT DOCUMENTS

| | | | | |
|---|---|---|---|---|
| 2008/0116870 | A1* | 5/2008 | Lin | H02M 3/33523 323/282 |
| 2008/0278131 | A1* | 11/2008 | Park | H02M 3/33515 323/282 |
| 2009/0021968 | A1* | 1/2009 | Komatsu | H02M 3/33507 363/126 |
| 2010/0054000 | A1* | 3/2010 | Huynh | H02M 3/33507 363/21.16 |
| 2011/0090718 | A1 | 4/2011 | Morota | |
| 2011/0096573 | A1 | 4/2011 | Zhu | |
| 2011/0316449 | A1 | 12/2011 | Imanaka | |
| 2012/0281438 | A1* | 11/2012 | Fang | H02M 3/33507 363/21.12 |
| 2013/0141946 | A1* | 6/2013 | Sakurai | H02M 3/33523 363/21.16 |
| 2013/0250628 | A1* | 9/2013 | Lin | H02M 1/08 363/21.16 |
| 2013/0272036 | A1 | 10/2013 | Fang | |
| 2014/0160809 | A1 | 6/2014 | Lin | |
| 2014/0211510 | A1* | 7/2014 | Feldtkeller | G01R 19/04 363/15 |
| 2014/0241014 | A1* | 8/2014 | Zhang | H02M 3/33507 363/21.17 |

FOREIGN PATENT DOCUMENTS

| | | |
|---|---|---|
| JP | 2011-091925 | 5/2011 |
| JP | 2013-062947 | 4/2013 |
| JP | 2013-121214 | 6/2013 |
| JP | 2013-150456 | 8/2013 |

* cited by examiner

FIG. 16

|  | SSR | PSR | PSR +CommIC |
|---|---|---|---|
| PHOTOCOUPLER | × (NECESSARY) | ○ (UNNECESSARY) | ○ (UNNECESSARY) |
| LOAD REGULATION | ◎ | △ | ○ |
| STANDBY POWER | × | ○ | ○ |
| THE NUMBER OF COMPONENTS | × | ◎ | ○ |
| APPLICABLE RANGE | ◎ | △ | ○ |

INSULATION TYPE SWITCHING POWER SOURCE APPARATUS

CROSS-REFERENCE TO RELATED APPLICATIONS

This application is a divisional of U.S. patent application Ser. No. 14/506,763, filed Oct. 6, 2014 which claims priority to the following Japanese Patent Applications, the contents of which are hereby incorporated by reference:
(1) Patent Application No. 2013-211279 (the filing date: Oct. 8, 2013)
(2) Patent Application No. 2013-231093 (the filing date: Nov. 7, 2013)

BACKGROUND OF THE INVENTION

1. Field of the Invention

The present invention relates to an insulation type switching power source apparatus.

2. Description of Related Art

Conventionally, an insulation type switching power source, which insulates a primary circuit system and a secondary circuit system from each other and generates a desired output voltage from an input voltage, is used for various electronic apparatuses.

In the meantime, as prior art examples relevant to the above description, there are JP-A-2013-62947 and JP-A-2005-261128.

Generally, an insulation type switching power source apparatus has a structure (SSR [secondary side regulator] system) which uses a photocoupler to perform output feedback control. However, the conventional structure using a photocoupler has problems of long-term reliability deterioration and cost increase due to increase in the number of components.

Besides, conventionally, also an insulation type switching power source apparatus is proposed, which does not use a photocoupler but uses an auxiliary winding or primary winding of a transformer to perform output feedback control (PSR [primary side regulator] system). However, in the conventional structure that uses an auxiliary winding or a primary winding, there is room for further improvement as to accuracy of the output feedback control.

SUMMARY OF THE INVENTION

In light of the problems found by the inventor of the present application, it is an object of the present invention to provide an insulation type switching power source apparatus that can perform highly accurate output feedback control.

An insulation type switching power source apparatus disclosed in the present specification comprises: a transformer that insulates a primary circuit system and a secondary circuit system from each other and uses a primary winding and a secondary winding to transform an input voltage into an output voltage; a switching control device that is disposed in the primary circuit system to drive the primary winding; and an output monitor device that is disposed in the secondary circuit system to monitor the output voltage, wherein the transformer includes a first auxiliary winding disposed in the primary circuit system and a second auxiliary winding disposed in the secondary circuit system besides the primary winding and the secondary winding; the output monitor device drives the second auxiliary winding to generate an induced voltage in the first auxiliary winding when the output voltage becomes smaller than a predetermined threshold value voltage; and the switching control device temporarily stops driving of the first winding upon detecting a light load state and resumes the driving of the first winding upon detecting the induced voltage in the first auxiliary winding.

An insulation type switching power source apparatus disclosed in the present specification comprises: a sample/hold circuit that samples/holds a feedback voltage, which is generated by using an auxiliary winding or a primary winding of a transformer, to generate a holding voltage; and a primary current control circuit that controls, in accordance with the holding voltage, a primary current that flows in the primary winding, wherein the sample/hold circuit counts a feedback voltage keeping duration from a time when the primary current is interrupted to a time when the feedback voltage becomes smaller than a threshold voltage, and based on a result of the counting, samples/holds the feedback voltage near an end of the feedback voltage keeping duration.

In the meantime, other features, elements, steps, advantages and characteristics of the present invention will become more apparent from the following detailed description of preferred embodiments with reference to the relevant attached drawings.

BRIEF DESCRIPTION OF THE DRAWINGS

FIG. 16 is a comparison table of systems.

DETAILED DESCRIPTION OF THE PREFERRED EMBODIMENTS

First Embodiment

Figure 1:
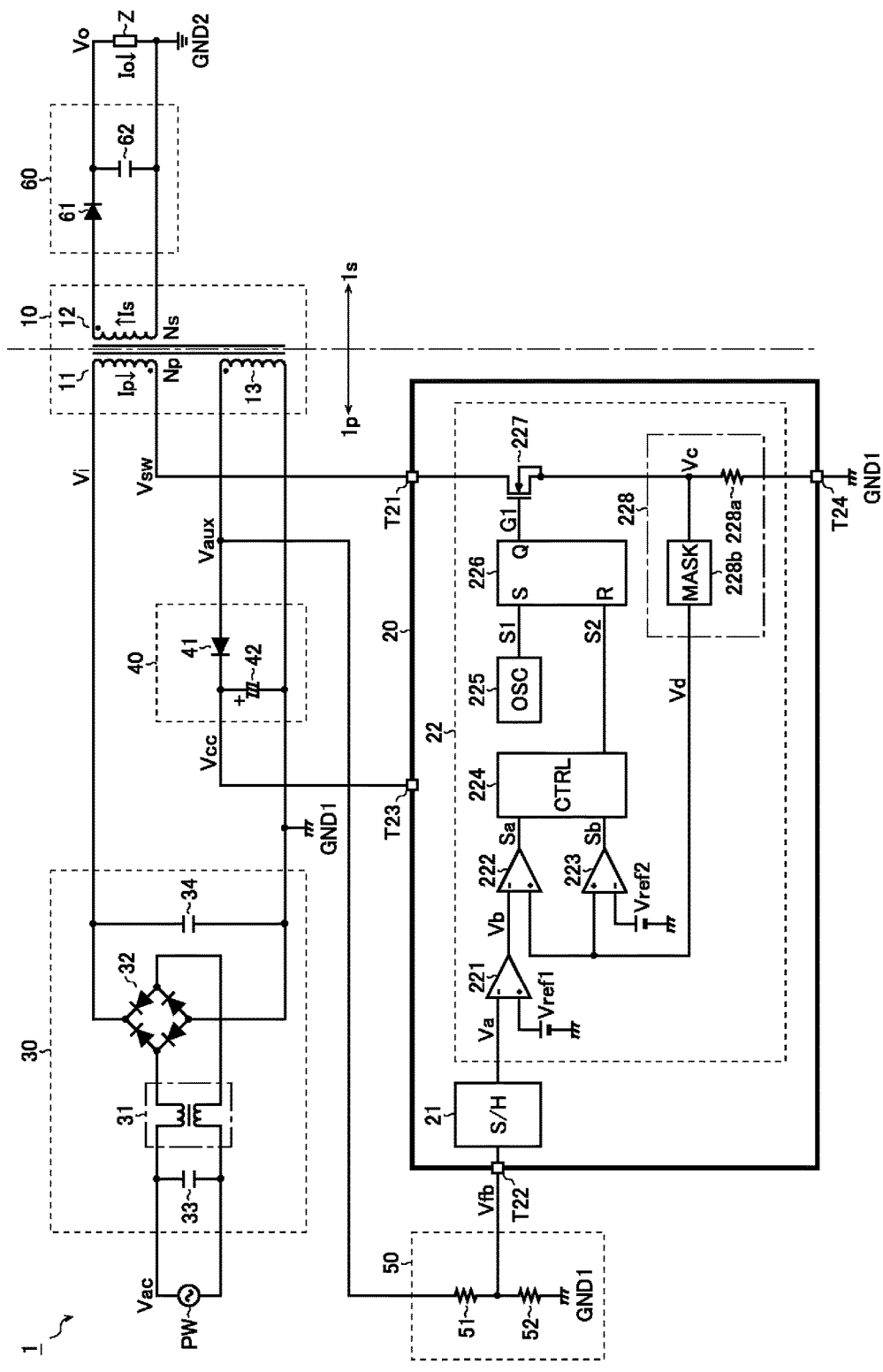
FIG. 1 is a view showing a first embodiment of an insulation type switching power source apparatus.

FIG. 1 is a block diagram showing a first embodiment of an insulation type switching power source apparatus. The insulation type switching power source apparatus 1 is an AC/DC converter that insulates electrically a primary circuit system 1p (GND1 system) and a secondary circuit system 1s (GND2 system) from each other, transforms an a.c. voltage Vac supplied from a commercial a.c. power source PW into a d.c. output voltage Vo, supplies the output voltage to a load Z, and includes: a transformer 10; a semiconductor device 20; an AC/DC conversion portion 30; a power source voltage generation portion 40; a feedback voltage generation portion 50; and a rectifying-smoothing portion 60.

The transformer 10 insulates electrically the primary circuit system 1p and the secondary circuit system 1s from each other, and includes a primary winding 11 (the number of turns: Np) and a secondary winding 12 (the number of turns: Ns) that are magnetically connected to each other with opposite polarities. A first terminal of the primary winding 11 is connected to an application terminal for an input voltage Vi. A second terminal of the primary winding 11 is connected to a ground terminal GND 1 of the primary circuit system 1p via the semiconductor device 20. A first terminal of the secondary winding 12 is connected to an application terminal (power source input terminal of the load Z) for the output voltage Vo via the rectifying-smoothing portion 60. A second terminal of the secondary winding 12 is connected to a ground terminal GND 2 of the secondary circuit system 1s. In the meantime, the numbers of turns Np and Ns may be arbitrarily adjusted such that the desired output voltage Vo is obtained. For example, the larger the number of turns Np is or the smaller the number of turns Ns is, the lower the output voltage Vo becomes, reversely, the smaller the number of turns Np is or the larger the number of turns Ns is, the higher the output voltage Vo becomes. Besides, the transformer 10 includes an auxiliary winding 13 in addition to the primary winding 11 and the secondary winding 12. The auxiliary winding 13 is used to generate a power source voltage Vcc and a feedback voltage Vfb.

The semiconductor device 20 is a switching control IC that is a drive engine for the transformer 10, and integrates therein a sample/hold circuit 21 and a primary current control circuit 22. Besides, the semiconductor device 20 has external terminals T21 to T24 as devices for establishing electric connection with outside of the device. In the meantime, FIG. 1 illustrates the four terminals of the external terminal T21 (DRAIN pin), the external terminal T22 (FB pin), the external terminal T23 (VCC pin), and the external terminal T24 (GND pin), however, external terminals (e.g., external terminals for connecting resistors for adjustment of reference voltages Vref1 and Vref2 described later) other than those may be disposed.

The sample/hold circuit 21 samples/holds the feedback voltage Vfb applied to the external terminal T22 to generate a holding voltage Va. A structure and operation of the sample/hold circuit 21 are described in detail later.

In accordance with the holding voltage Va that is generated by the sample/hold circuit 21, the primary current control circuit 22 basically controls a primary current Ip that flows in the primary winding. The primary current control circuit 22 includes: an error amplifier 221; comparators 222 and 223; a controller 224; an oscillator 225; an RS flip-flop 226; an output switch 227; and a detection voltage generation portion 228.

The error amp 221 generates an error voltage Vb in accordance with a difference between the holding voltage Va applied to an inverting input terminal (−) and the reference voltage Vref1 applied to a non-inverting input terminal (+). More specifically, the error amp 221 pulls down the error voltage Vb when the holding voltage Va is higher than the reference voltage Vref1, and pulls up the error voltage Vb when the holding voltage Va is lower than the reference voltage Vref1.

The comparator 222 compares the error voltage Vb applied to an inverting input terminal (−) with a detection voltage Vd applied to a non-inverting input terminal (+) to generate a comparison signal Sa. The comparison signal Sa goes to a high level when the detection voltage Vd is higher than the error voltage Vb, and goes to a low level when the detection voltage Vd is lower than the error voltage Vb.

The comparator 223 compares the reference voltage Vref2 applied to an inverting input terminal (−) with the detection voltage Vd applied to a non-inverting input terminal (+) to generate a comparison signal Sb. The comparison signal Sb goes to a high level when the detection voltage Vd is higher than the reference voltage Vref2, and goes to a low level when the detection voltage Vd is lower than the reference voltage Vref2.

The controller 224 generates a pulse in an off-signal S2 in accordance with the comparison signals Sa and Sb. More specifically, the controller 224 detects rising edges of the comparison signals Sa and Sb to generate the pulse in the off-signal S2.

The oscillator 225 generates pulses in an on-signal S1 at a predetermined frequency fosc (e.g., 30 kHz).

The RS flip-flop 226 generates a gate signal G1 (which corresponds to an output control signal) in accordance with the on-signal S1 input into a set terminal (S) and the off-signal S2 input into a reset terminal (R). More specifically, the RS flip-flop 226 sets the gate signal G1 to a high level at a rising edge of the on-signal S1 and resets the gate signal G1 to a low level at a rising edge of the off-signal S2.

The output switch 227 is a switch device that activates/inactivates an electric-current route which extends from the application terminal for the input voltage Vi to the ground terminal GND1 via the primary winding 11 and thereby flows/interrupts the primary current Ip that flows in the primary winding 11. In the present structural example, an N channel type MOS [metal oxide semiconductor] field effect transistor is used as the output switch 227. Describing a connection relationship, a drain of the output switch 227 is connected to the second terminal of the primary winding 11 via the external terminal T21. Both a source and a back gate of the output switch 227 are connected to the external terminal T24 (ground terminal GND1) via the detection voltage generation portion 228. A gate of the output switch 227 is connected to an application terminal for the gate signal G1. The output switch 227 is turned on when the gate signal G1 is at the high level, and turned off when the gate signal G1 is at the low level.

The detection voltage generation portion 228 includes a sense resistor 228a and a mask process portion 228b. The sense resistor 228a is connected between the output switch 227 and the external terminal T24 (ground terminal GND1) and generates a sense voltage Vc in accordance with the primary current Ip. The mask process portion 228b applies a mask process to the sense voltage Vc to generate the detection voltage Vd. More specifically, the mask process portion 228b fixes the detection voltage Vd at a zero value for a predetermined mask duration (see time points t11 to t12 of FIG. 2) after the output switch 227 is turned on. According to such structure, it becomes possible to raise stability of the switching control operation without being influenced by a ringing noise of the sense voltage Vc that occurs at the on-time of the output switch 227.

The AC/DC conversion portion 30 includes a filter 31, a diode bridge 32, capacitors 33 and 34, and generates a d.c. input voltage Vin from the a.c. voltage Vac. The filter 31 removes a noise and a surge from the a.c. voltage Vac. The diode bridge 32 applies full-wave rectification to the a.c. voltage Vac to generate the input voltage Vin. The capacitor 33 removes a higher harmonic noise of the a.c. voltage Vac. The capacitor 34 smooths the input voltage Vin. In the meantime, the AC/DC conversion portion 30 may include a protection device such as a fuse or the like.

The power source voltage generation portion 40 is a rectifying-smoothing circuit that includes a diode 41 and a capacitor 42, generates, from an induced voltage Vaux of the auxiliary winding 13, the power source voltage Vcc for the semiconductor device 20, and applies the generated voltage to the external terminal T23 of the semiconductor device 20. A winding ratio of the primary winding 11 and the auxiliary winding 13 may be suitably set in light of the power source voltage Vcc necessary for operation of the semiconductor device 20.

The feedback voltage generation portion 50 includes resistors 51 and 52 connected in series between an application terminal for the induced voltage Vaux and the ground terminal GND1, generates the feedback voltage Vfb by diving the induced voltage Vaux, and applies the feedback voltage to the external terminal T22 of the semiconductor device 20. The higher the output voltage Vo is, the higher the induced voltage Vaux becomes, and also the feedback voltage Vfb becomes higher. Reversely, the lower the output voltage Vo is, the lower the induced voltage Vaux becomes, and also the feedback voltage Vfb becomes lower. As described above, the feedback voltage Vfb changes in accordance with the output voltage Vo. Accordingly, if the feedback voltage Vfb is generated from the induced voltage Vaux of the auxiliary winding 13, it is possible to perform output feedback control without using a photocoupler. In the meantime, the feedback voltage generation portion 50 may have a structure which generates the feedback voltage Vfb from a switch voltage Vsw that appears at a connection node between the primary winding 11 and the output switch 227.

The rectifying-smoothing portion 60 includes a rectifying diode 61 and a smoothing capacitor 62, rectifies and smooths an induced voltage occurring in the secondary winding 12 to generate the output voltage Vo. Describing a connection relationship, an anode of the diode 61 is connected to the first terminal of the secondary winding 12. Both a cathode of the diode 61 and a first terminal of the capacitor 62 are connected to the application terminal for the output voltage Vo. A second terminal of the capacitor 62 is connected to the ground terminal GND2.

<Switching Control Operation>

Figure 2:
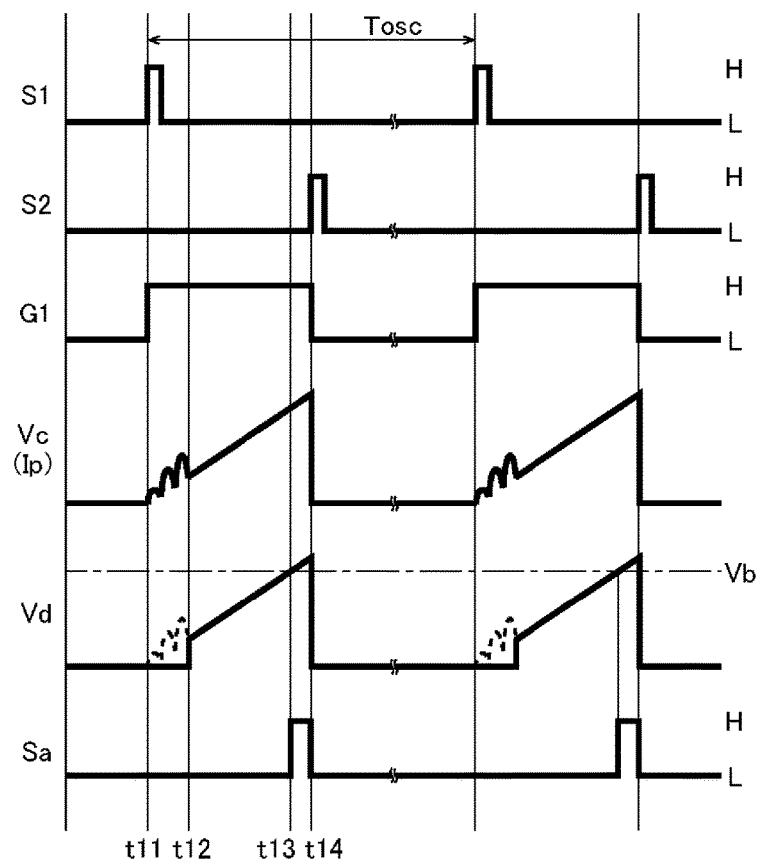
FIG. 2 is a timing chart showing an example of a switching control operation.

FIG. 2 is a timing chart showing an example of a switching control operation, and illustrates, from top in order, the on-signal S1; the off-signal S2; the gate signal G1; the sense voltage Vc (primary current Ip); the detection voltage Vd; and the comparison signal Sa.

At a time point t11, if a pulse is generated in the on-signal S1, the gate signal G1 is set to the high level and the output switch 227 is turned on. During an on-duration of the output switch 227, the primary current Ip flows from the application terminal for the input voltage Vi to the ground terminal GND1 via the primary winding 11 and the output switch 227; accordingly, electric energy is stored into the primary winding 11.

In the meantime, as described above, the detection voltage Vd is fixeda the zero value for the predetermined mask duration (time points t11 to t12) after the output switch 227 is turned on, and the ringing noise of the sense voltage Vc is masked.

Thereafter, at a time point t13, if the detection voltage Vd becomes higher than the error voltage Vb and the comparison signal Sa is raised to the high level, a pulse is generated in the off-signal S2 at a time point t14. As a result of this, the gate signal G1 is reset to the low level and the output switch 227 is turned off. During an off-duration of the output switch 227, an induced voltage occurs in the secondary winding 12 connected magnetically to the primary winding 11, and a secondary current Is flows from the secondary winding 12 to the ground terminal GND2 via the diode 61. At this time, the load Z is supplied with the output voltage Vo that is obtained by applying half-wave rectification to the induced voltage of the secondary winding 12.

Besides, at a time point t14, if the output switch 227 is turned off, the primary current Ip is interrupted; accordingly, both the sense voltage Vc and the detection voltage Vd fall to the zero value and the comparison signal Sa goes to the low level. Also after the time point t14, pulses for the on-signal S1 are generated at a predetermined oscillation frequency Tosc (=1/fosc), and the basically same switching control operation as the above description is repeated.

As described above, according to the insulation type switching power source apparatus 1 in the present structural example, it is possible to electrically insulate the primary circuit system 1p and the secondary circuit system is from each other, generate the output voltage Vo from the a.c. voltage Vac and supply the generated voltage to the load Z. In the meantime, a flyback system employed in the insulation type switching power source apparatus 1 in the present structural example has a smaller number of components than a forward system that requires a smoothing inductor, accordingly, is also advantageous to cost reduction.

<Constant Voltage Control and Constant Current Control>

Figure 3:
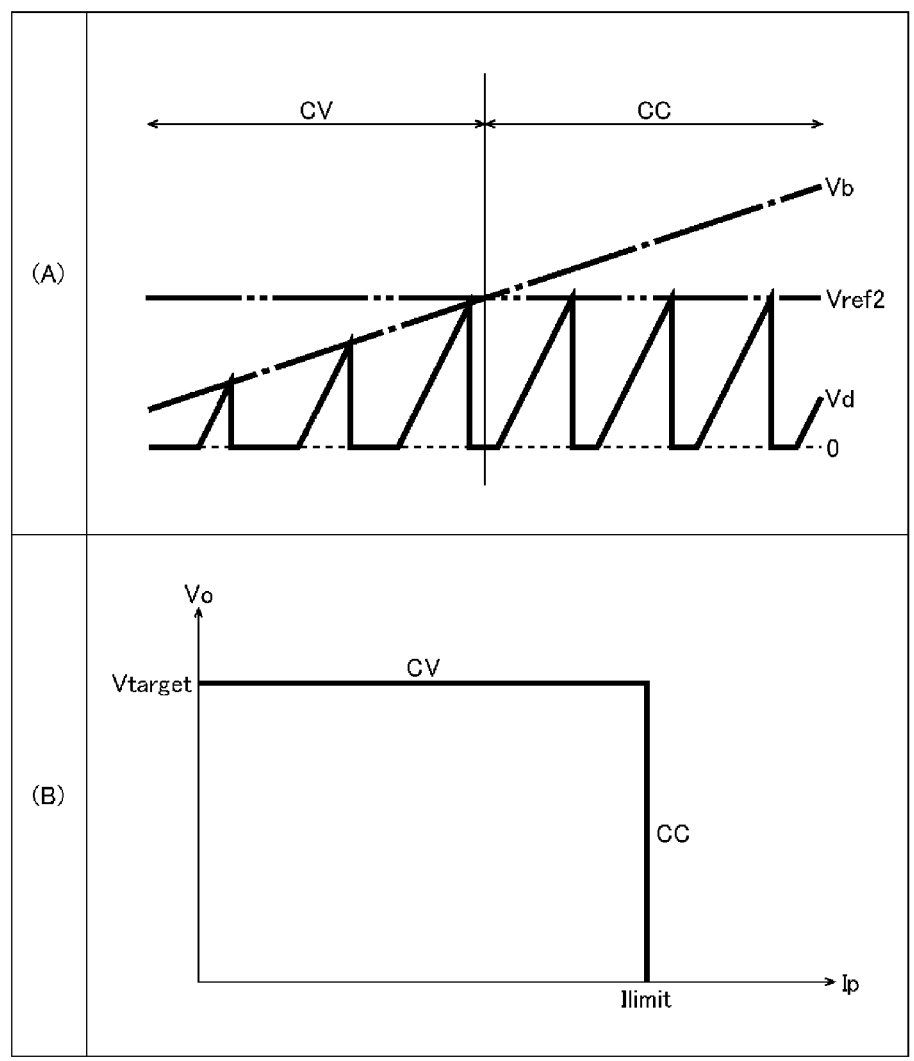
FIG. 3 is a view for describing a switchover operation between constant voltage control and constant current control.

FIG. 3 is a view for describing a switchover operation between constant voltage control and constant current control. In a case where a difference between the output voltage Vo and a target voltage Vtarget is small and the error voltage Vb is lower than the reference voltage Vref2, the controller 224 generates a pulse for the off-signal S2 in accordance with a result (=comparison signal Sa) of the comparison of the error voltage Vb and the detection voltage Vd. This state corresponds to a state where constant voltage control corresponding to the comparison signal Sa (see a sign CV [constant voltage] in (A) box and (B) box) is performed.

On the other hand, if the difference between the output voltage Vo and the target voltage Vtarget becomes large and the error voltage Vb becomes higher than the reference voltage Vref2, the controller 224 generates a pulse for the off-signal S2 in accordance with a result (=comparison signal Sb) of the comparison of the error voltage Vref2 and the detection voltage Vd. This state corresponds to a state where the primary current Ip reaches an upper limit value Ilimit and constant current control corresponding to the comparison signal Sb (see a sign CC [constant current] in (A) box and (B) box) is performed.

As described above, in accordance with whether the primary current Ip reaches the upper limit value Ilimit or not (and whether the output current Io flowing in the load Z reaches a predetermined upper limit value or not), the controller 224 performs either of the constant voltage control corresponding to the comparison signal Sa and the constant current control corresponding to the comparison signal Sb.

<Sample/Hold Circuit>

Figure 4:
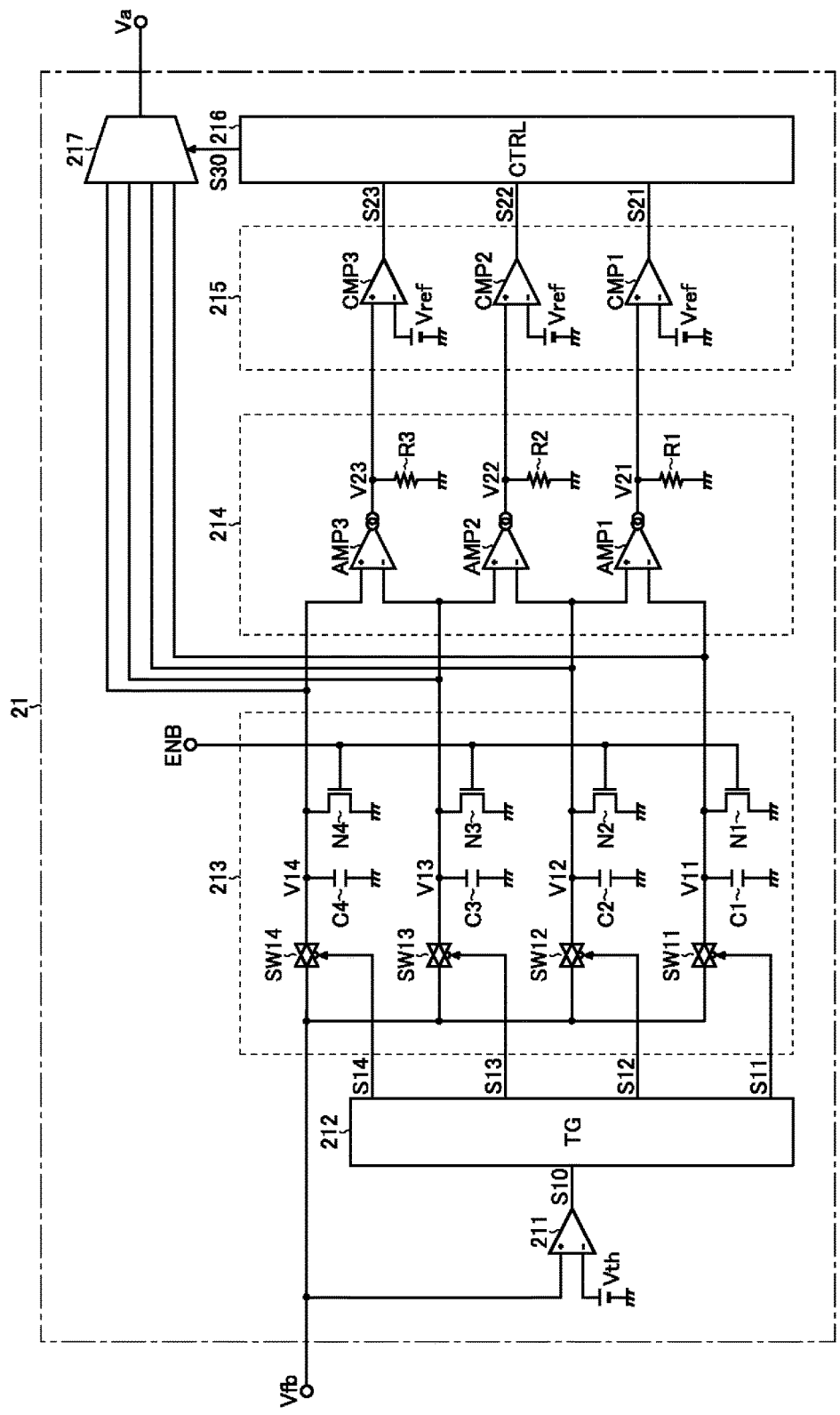
FIG. 4 is a view showing a structural example of a sample/hold circuit.

FIG. 4 is a view showing a structural example of the sample/hold circuit 21. The sample/hold circuit in the present structural example includes: a comparator 211; a timing generator 212; a sample/hold portion 231; a difference process portion 214; a comparison process portion 215; a control portion 216; and a selector 217.

The comparator 211 compares the feedback voltage Vfb applied to a non-inverting input terminal (+) with a threshold value voltage Vth applied to an inverting input terminal (−) to generate a comparison signal S10. The comparison signal S10 goes to a high level when the feedback voltage Vfb is higher than the threshold value voltage Vth, and goes to a low level when the feedback voltage Vfb is lower than the threshold value voltage Vth.

The timing generator 212 detects a pulse edge of the comparison signal S10, thereby counts a feedback voltage keeping duration (see signs T1 to T4 of FIG. 5) until the feedback voltage Vfb becomes lower than the threshold value voltage Vth after the primary current Ip is interrupted, and generates timing signals S11 to S14 to sample/hold the feedback voltage Vfb near an end of the feedback voltage keeping duration based on a result of the counting. In the meantime, the interruption timing (count start timing of the feedback voltage keeping duration T1 to T4) of the primary current Ip may be decided based on a falling edge of the gate signal G1 or a rising edge of the off-signal S2 instead of a rising edge of the comparison signal S10. Operation of the timing generator 212 is described in detail later.

The sample/hold portion 213 includes analog switches SW11 to SW14, capacitors C1 to C4, and N channel type MOS field effect transistors N1 to N4, and applies the sample/hold operation to the feedback voltage Vfb in accordance with the timing signals S11 to S14. First terminals of the analog switches SW11 to SW14 are all connected to the application terminal for the feedback voltage Vfb. Second terminals of the analog switches SW11 to SW14 are connected to output terminals for hold values V11 to V14, respectively. Control terminals of the analog switches SW11 to SW14 are connected to application terminals for the timing signals S11 to S14, respectively. Each of the capacitors C1 to C4 is connected between the output terminal for each of the hold values V11 to V14 and a ground terminal. Each of the transistors N1 to N4 is connected between the output terminal for each of the hold values V11 to V14 and a ground terminal. Gates of the transistors N1 to N4 are all connected to an application terminal for an enable signal ENB.

The analog switches SW11 to SW14 are respectively turned on when the timing signals S11 to S14 are at high levels, and respectively turned off when the timing signals S11 to S14 are at low levels. On-durations of the analog switches S11 to S14 correspond to a sampling duration of the sample/hold portion 213, and during the on-durations, the capacitors C1 to C4 are charged by means of the feedback voltage Vfb. On the other hand, off-durations of the analog switches S11 to S14 correspond to a hold duration of the sample/hold portion 213, and charged voltages of the capacitors C1 to C14 are held as the hold values V11 to V14. The transistors N1 to N4 are turned off when the enable signal ENB is at a low level (logic level during enable time) and turned off when the enable signal ENB is at a high level (logic level during disable time). If the transistors N1 to N4 are turned on, the capacitors C1 to C4 are discharged and the hold values V11 to V14 are reset to the zero value.

The difference process portion 214 includes electric current output amplifiers AMP1 to AMP3 and resistors R1 to R3, and generates difference values V21 to V23 between adjacent hold values. An inverting input terminal (−) of the electric current output amp AMP1 is connected to the output terminal for the hold value V11. Both a non-inverting input terminal (+) of the electric current output amp AMP1 and an inverting input terminal (−) of the electric current output amp AMP2 are connected to the output terminal for the hold value V12. Both a non-inverting input terminal (+) of the electric current output amp AMP2 and an inverting input terminal (−) of the electric current output amp AMP3 are connected to the output terminal for the hold value V3. A non-inverting input terminal (+) of the electric current output amp AMP3 is connected to the output terminal for the hold value V14. Output terminals of the electric current output amps AMP1 to AMP3 are connected to output terminals for the difference values V21 to V23, respectively. Each of the resistors R1 to R3 is connected between the output terminal for each of the difference values V21 to V24 and a ground terminal.

As the hold value V11 becomes lower than the hold value V12, the electric current output amp AMP1 flows more current into the resistor R1 to pull up the difference value V21. As the hold value V12 becomes lower than the hold value V13, the electric current output amp AMP2 flows more current into the resistor R2 to pull up the difference value V22. As the hold value V13 becomes lower than the hold value V14, the electric current output amp AMP3 flows more current into the resistor R3 to pull up the difference value V23.

The comparison process portion 215 includes comparators CMP1 to CMP3, and compares each of the difference values 21 to 23 with a reference voltage Vref (which corresponds to a threshold value drop size) to generate comparison signals S21 to S23. The comparison signals S21 to S23 respectively go to a high level when the difference values V21 to V23 are higher than the reference voltage Vref, and respectively go to a low level when the difference values V21 to V23 are lower than the reference voltage Vref. In the meantime, in the present structural example, an example is described in which the three comparators CMP1 to CMP3 are disposed in parallel with one another; however, the structure of the comparison process portion 215 is not limited to this, but for example, a structure may be employed, in which a single comparator is used in time division; whereby the difference values V21 to V23 are successively compared with the reference voltage Vref.

The control portion 216 generates a switchover signal S30 for the selector 217 based on the comparison signals S21 to S23. Operation of the control portion 216 is described in detail later.

The selector 217 selectively outputs, in accordance with the switchover signal 30, any one of the hold values V11 to V14 as the holding voltage Va.

<Sample/Hold Operation>

Figure 5:
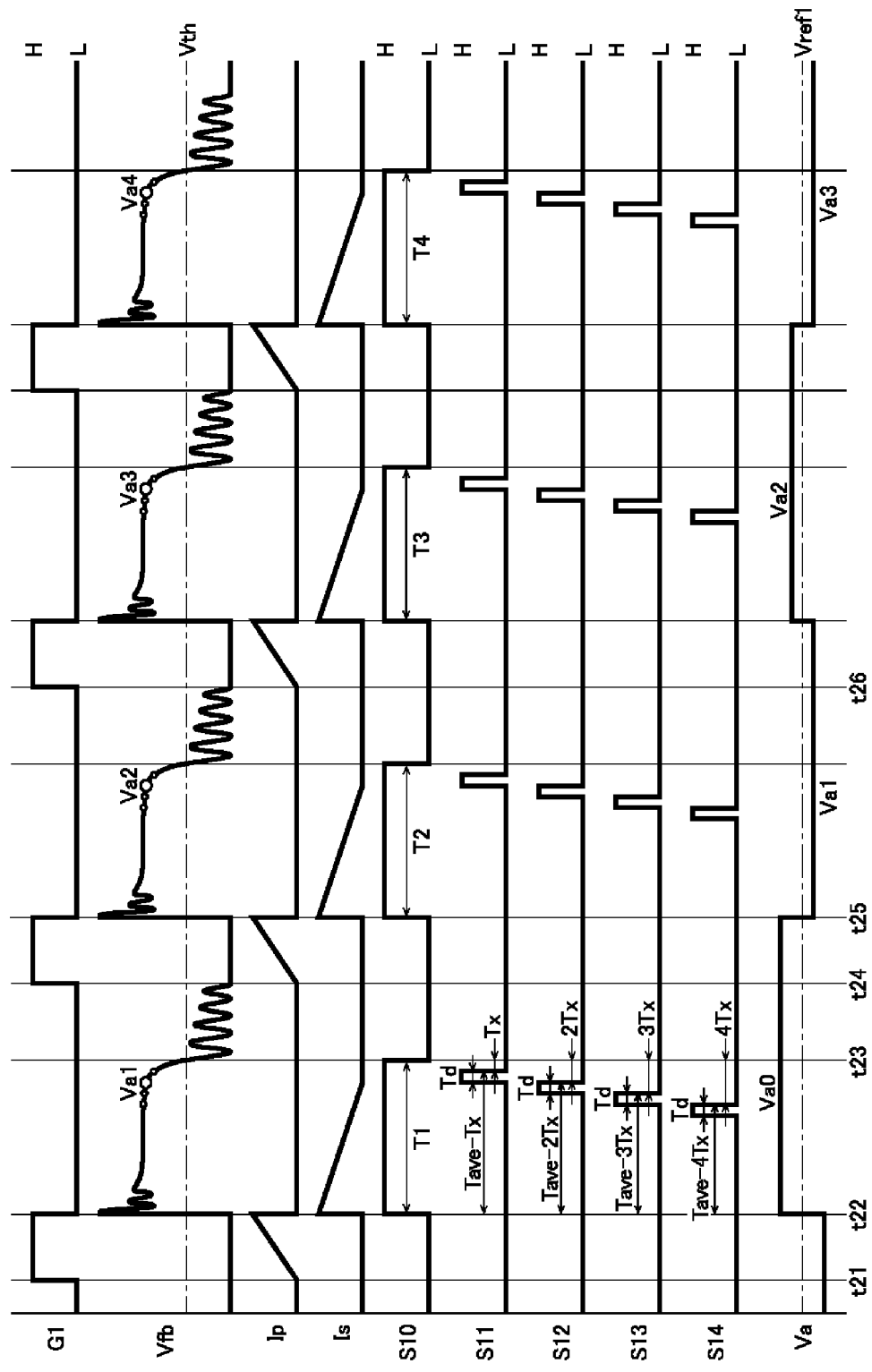
FIG. 5 is a timing chart showing an example of a sample/hold operation.

FIG. 5 is a timing chart showing an example of the sample/hold operation, and illustrates, from top in order, the gate signal G1; the feedback voltage Vfb; the primary current Ip; the secondary current Is; the comparison signal S10; the timing signals S11 to S14; and the holding voltage Va.

At a time point t21, if the gate signal G1 is brought to the high level and the output switch 227 is turned on, the primary current Ip flows and energy is stored into the transformer 10.

Thereafter, at a time point t22, if the gate signal G1 is brought to the low level and the output switch 227 is turned off, the primary current Ip is interrupted and the secondary current Is starts to flow. At this time, the feedback voltage Vfb becomes higher than the threshold value voltage Vth and the comparison signal S10 goes to the high level.

Thereafter, if the energy stored in the transformer 10 runs out and the secondary current Is stops flowing, at a time point t23, the feedback voltage Vfb becomes lower than the threshold value voltage Vth and the comparison signal S10 falls to the low level.

The timing generator 212 counts, for every period, the feedback voltage keeping durations T1 to T4 (which correspond to a high level duration of the comparison signal S10) until the feedback voltage Vfb becomes lower than the threshold value voltage Vth after the primary current Ip is interrupted, calculates a moving average value of the nearest N periods to obtain an average feedback voltage keeping duration Tave.

And, the timing generator 212 uses the average feedback voltage keeping duration Tave and a predetermined shift duration Tx (e.g., 100 µs) and thereby generates the timing signals S11 to S14 to sample/hold the feedback voltage Vfb near ends (immediately before the time point t23) of the feedback voltage keeping durations T1 to T4.

Specifically, after the comparison signal S10 rises to the high level, first, the timing generator 212 generates the timing signal S14 to perform the sample/hold operation at a timing (Tave-4Tx) that is obtained by subtracting a duration, which is four times the shift duration Tx, from the average feedback voltage keeping duration Tave. Thereafter, the timing generator 212 generates the timing signals S13, S12, and S11 to successively perform the sample/hold operation at timings (Tave-3Tx, Tave-2Tx, Tave-Tx) that are obtained by subtracting durations, which are three times; two times and one times the shift duration Tx, from the average feedback voltage keeping duration Tave. In the meantime, high level durations Td (which correspond to the sampling duration) of the timing signals S11 to S14 may be all set to the same value (e.g., 100 µs).

In such timing control, the sample/hold circuit 21 in the present structural example repeats the sample/hold operation for the feedback voltage Vfb a plurality of times to obtain the plurality of hold values V11 to V14, and based on the comparison results (more correctly, results of the comparisons of the reference voltage Vref and each of the difference values V21 to V23 between adjacent hold values), selectively outputs any one of the hold values as the holding voltage Va.

In the meantime, in the example in the present figure, the holding voltage Va is updated with no delay after the end of an on-duration (time points t24 to t25) of the next period after the completion of the sample/hold operation during the off-duration (time points t22 to t24). However, the update timing of the holding voltage Va is not limited to this, but it is possible to update the holding voltage Va at an arbitrary timing during an off-duration (time points t25 to t26) of the next period.

Also after the time point t25, the basically same sample/hold operation is repeated, whereby the feedback voltage Vfb immediately before the secondary current becomes zero is successively held as the holding voltages Va1 to Va4.

In the meantime, when generating the timing signals S11 to S14, it is also possible to use the feedback voltage keeping duration in the previous period as a reference without calculating the average feedback voltage keeping duration Tave.

<Hold Value Selection Operation>

Figure 6:
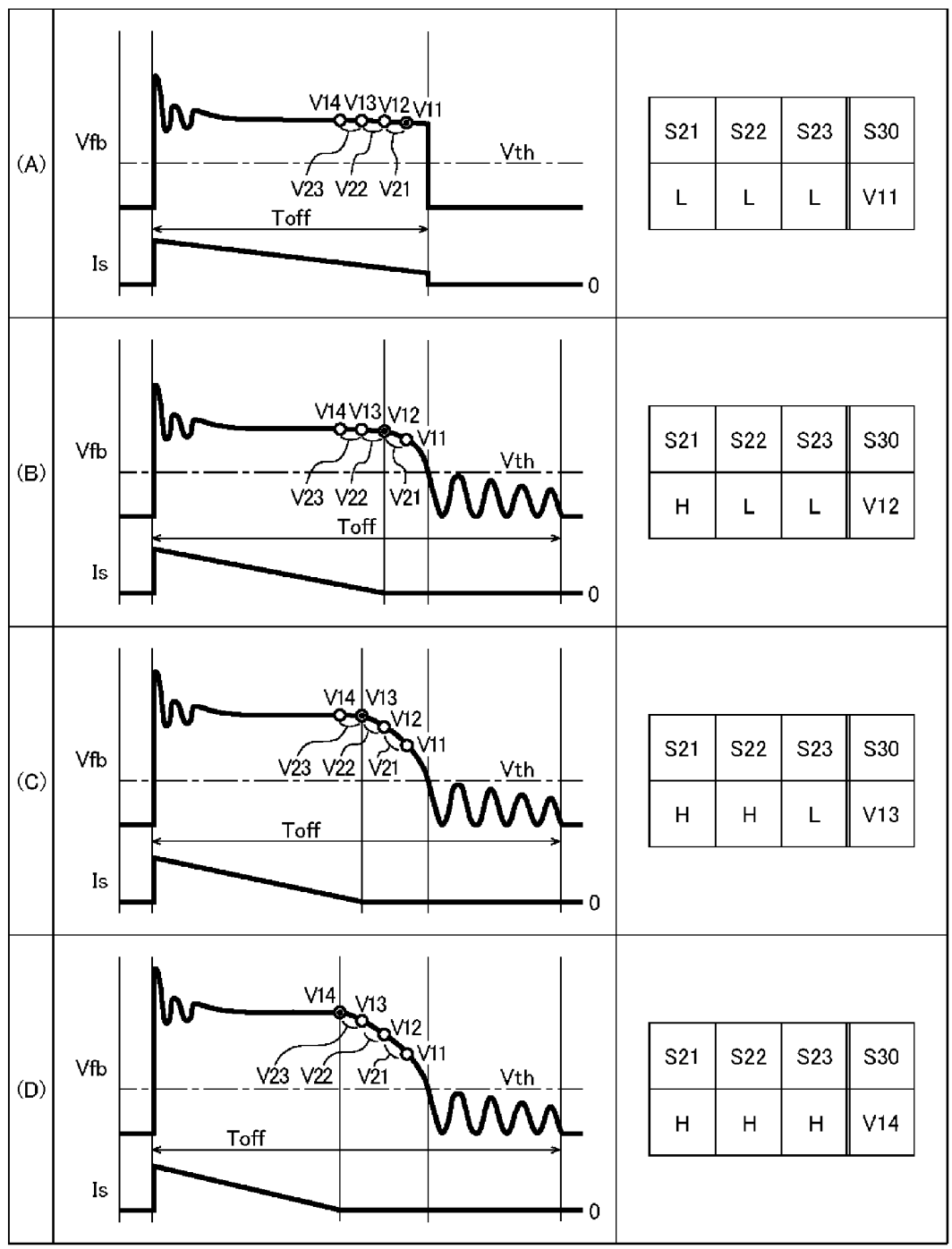
FIG. 6 is a view showing an example of a hold value selection operation.

FIG. 6 is a view showing an example of the hold value selection operation by the control portion 216. In a case (so-called electric current continuous mode) where the secondary current Is does not become the zero value during the off-duration Toff of the output switch 227 as shown in the (A) box of the present figure, the feedback voltage Vfb does not substantially drop until the output switch 227 is turned on. Accordingly, all of the difference values V21 to V23 between the adjacent hold values become smaller than the reference voltage Vref (which corresponds to the threshold drop size); accordingly, all of the comparison signals S21 to S23 go to the low level. Therefore, the control portion 216 responding to this selects the hold value 11 obtained lastly (the last timing) as the holding voltage Va.

On the other hand, as shown in the (B) box to (D) box of the present figure, in a case (so-called electric current discontinuous mode) where the secondary current Is becomes the zero value during the off-duration Toff of the output switch 227, the feedback voltage Vfb starts to drop sharply after the secondary current Is becomes the zero value, and soon becomes lower than the threshold value voltage Vth. For example, as shown in the (B) box of the present figure, in a case where a sharp drop of the feedback voltage Vfb occurs after the hold value V12 is obtained, the comparison signal S21 goes to the high level and the comparison signals S22 and S23 go to the low level. Accordingly, the control portion 216 responding to this selects, as the holding voltage Va, the hold value 12 immediately before the feedback voltage Vfb starts to drop sharply.

Besides, as shown in the (C) box of the present figure, in a case a sharp drop of the feedback voltage Vfb occurs after the hold value V13 is obtained, the comparison signals S21 and S22 go to the high level and the comparison signal S23 goes to the low level. Accordingly, the control portion 216 responding to this selects, as the holding voltage Va, the hold value 13 immediately before the feedback voltage Vfb starts to drop sharply.

Likewise, as shown in the (D) box of the present figure, in a case a sharp drop of the feedback voltage Vfb occurs after the hold value V14 is obtained, all of the comparison signals S21 to S23 go to the high level. Accordingly, the control portion 216 responding to this selects, as the holding voltage Va, the hold value 14 immediately before the feedback voltage Vfb starts to drop sharply.

In the meantime, the number of the sample/hold operations for the feedback voltage Vfb is not limited to four, but may be five or more, or three or smaller. However, it is necessary to take care about that circuit scale and power consumption increase unnecessarily if the number of the sample/hold operations is excessively increased. Besides, in a case where the number of the sample/hold operations is one, the circuit scale becomes minimum, but on the other hand, it becomes impossible to perform the difference process of the hold value; accordingly, it is necessary to take care about that it becomes hard to accurately sample/hold the feedback voltage Vfb immediately before the secondary current Is becomes zero.

<Another Method of Sample/Hold Operation>

Figure 7:
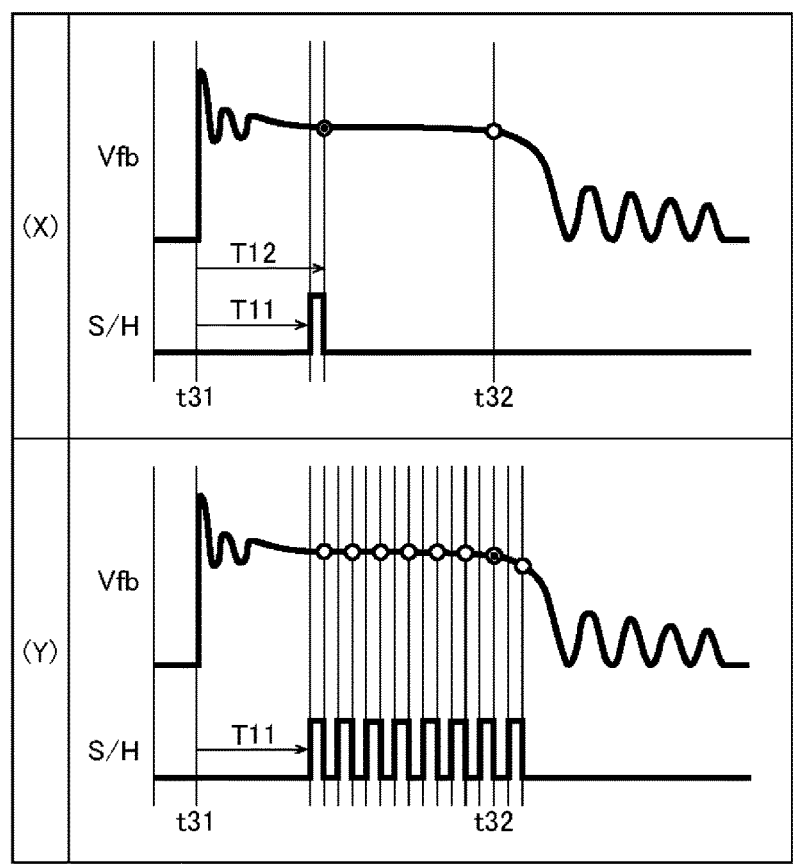
FIG. 7 is a view showing a sample/hold operation by means of another method.

FIG. 7 is a view showing a sample/hold operation by means of another method. As first another method, as shown in an (X) box of the present figure, a method is conceivable, in which by using an off-timing (time point t31) of the output switch 227 as a start point, a start timing T11 and end timing T12 of the sample/hold operation are set. However, in this method, it is very hard to sample/hold the feedback voltage Vfb immediately before (time point t32) the secondary current Is becomes zero. Besides, there is a restriction that the sample/hold operation must be performed during a duration from a time when a ringing of the feedback voltage Vfb ends to a time when the secondary current Is becomes zero. As to such restriction, there is a very severe restriction at the start timing T11 and end timing T12 of the sample/hold operation; accordingly, an applicable range of a set becomes narrow.

Besides, as second another method, as shown in a (Y) box of the present figure, a method is conceivable, in which by using the off-timing (time point t31) of the output switch 227 as a start point, the start timing T11 of the sample/hold operation is set; thereafter, the sample/hold operation is repeated many times until the feedback voltage Vfb starts to drop sharply. According to this method, it becomes possible to sample/hold the feedback voltage Vfb immediately before (time point t32) the secondary current Is becomes zero. However, in this method, the number of the sample/hold operations increases dramatically, which therefore incurs an unnecessary increase in the circuit scale and power consumption.

In contrast to this, according to the above sample/hold circuit 21, by using, as a start point, the timing (time point t23 of FIG. 5) when the feedback voltage Vfb becomes lower than the threshold value voltage Vth after the primary current Ip is turned off, the least necessary sample/hold operation is performed; accordingly, there are no problems with the other method.

Second Embodiment

Figure 8:
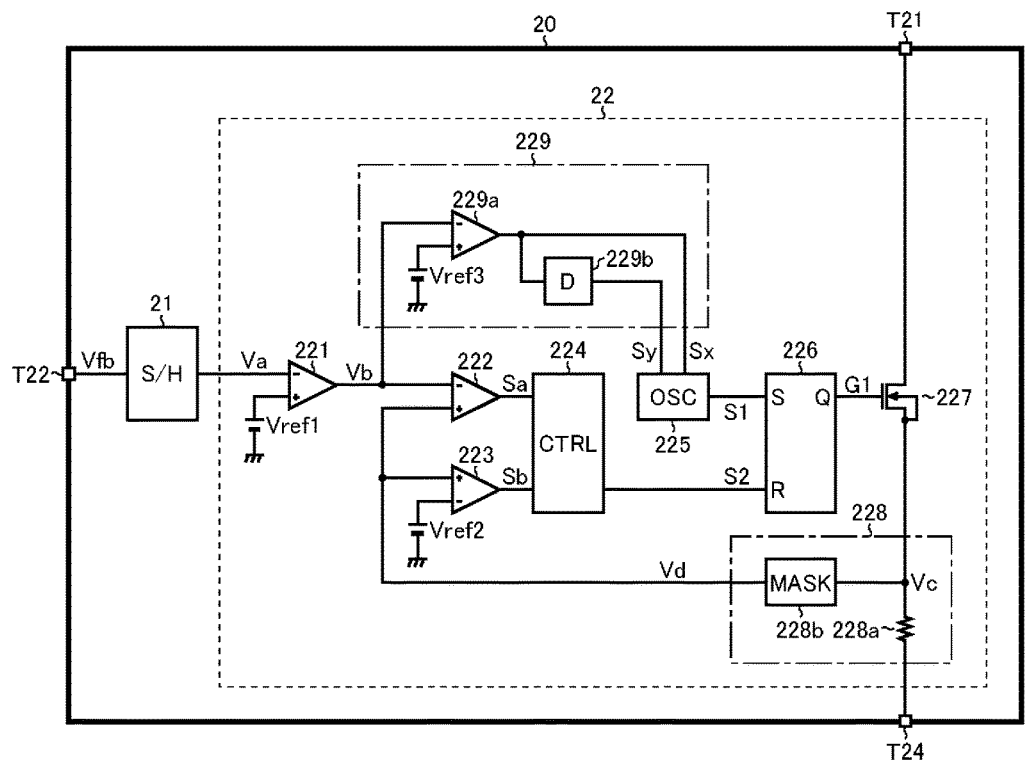
FIG. 8 is a view showing a second embodiment of an insulation type switching power source apparatus.

FIG. 8 is a view showing a second embodiment (only the semiconductor device 20 is illustrated) of the insulation type switching power source apparatus. The insulation type switching power source apparatus 1 according to the second embodiment has basically the same structure as the first embodiment, and has a feature that a burst control portion 229 is integrated in the semiconductor device 20. Accordingly, the same components as the first embodiment are indicated by the same signs as FIG. 1 to skip double description of them, and hereinafter, the burst control portion 229, which is the feature portion of the second embodiment, is mainly described.

The burst control portion 229 includes a comparator 229a and a signal delay portion 229b, and monitors the error voltage Vb to generate an oscillation stop signal Sx and an oscillation start signal Sy, thereby performing on/off control of the oscillator 225.

The comparator 229a compares the error voltage Vb applied to an inverting input terminal (−) with the reference voltage Vref3 applied to a non-inverting input terminal (+) to generate the oscillation stop signal Sx. The oscillation stop signal Sx goes to a low level when the error voltage Vb is higher than the reference voltage Vref3, and goes to a high level when the error voltage Vb is lower than the reference voltage Vref3.

The signal delay portion 229b delays the oscillation stop signal Sx by a burst duration Tbst to generate the oscillation start signal Sy. In other words, the oscillation start signal Sy goes to a high level when the burst duration Tbst elapses after the oscillation stop signal Sx rises to the high level.

The oscillator 225 stops oscillation (driving of the primary winding 11) of the on-signal S1 when the oscillation stop signal Sx rises to the high level, and resumes the oscillation of the on-signal S1 when the oscillation start signal Sy rises to the high level.

Figure 9:
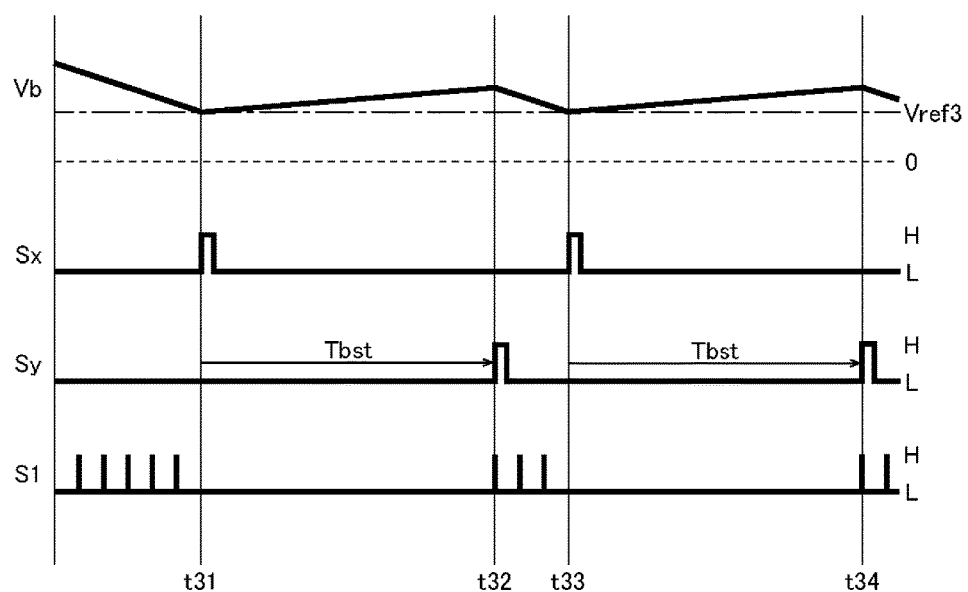
FIG. 9 is a timing chart showing an example of burst control.

FIG. 9 is a timing chart showing an example of the burst control, and illustrates, from top in order, the error voltage Vb, the oscillation stop signal Sx, the oscillation start signal Sy, and the on-signal S1. In a light load state (state where the output current Io flowing in the load Z is small and the output voltage Vo hardly drops), a difference between the output voltage Vo and the target voltage Vtarget becomes small; accordingly, the error voltage Vb drops.

And, at the time point t31, if the error voltage Vb becomes lower than the reference voltage Vref3, the oscillation stop signal Sx rises to the high level, and the insulation type switching power source apparatus 1 shifts to a burst mode in which the oscillation (driving of the primary winding 11) of the on-signal S1 is temporarily stopped. In the burst mode, the output switch 227 is not turned on/off unnecessarily; accordingly, it becomes possible to raise efficiency in the light load state.

If the predetermined burst duration Tbst elapses after shifting to the burst mode, the oscillation start signal Sy rises to the high level at the time point t32; accordingly, the oscillation of the on-signal S1 is resumed and the insulation type switching power source apparatus 1 returns to a usual mode. In the meantime, between the time points t31 and t32, the error voltage Vb increases slightly, this is because the holding voltage Va drops gradually because of a natural discharge and the like.

If the light load state continues even after the oscillation resumption of the on-signal S1, at a time point t33, the oscillation stop signal Sx rises again to the high level and the oscillation of the on-signal S1 is stopped temporarily. As described above, even after the time point t33, as long as the light load state continues, the shift to the burst mode and the return to the usual mode are repeated.

As described above, in the insulation type switching power source apparatus 1 according to the second embodiment, by mounting the burst control portion 229, it becomes possible to raise the efficiency in the light load state. However, the insulation type switching power source apparatus 1 according to the second embodiment has two problems.

Figure 10:
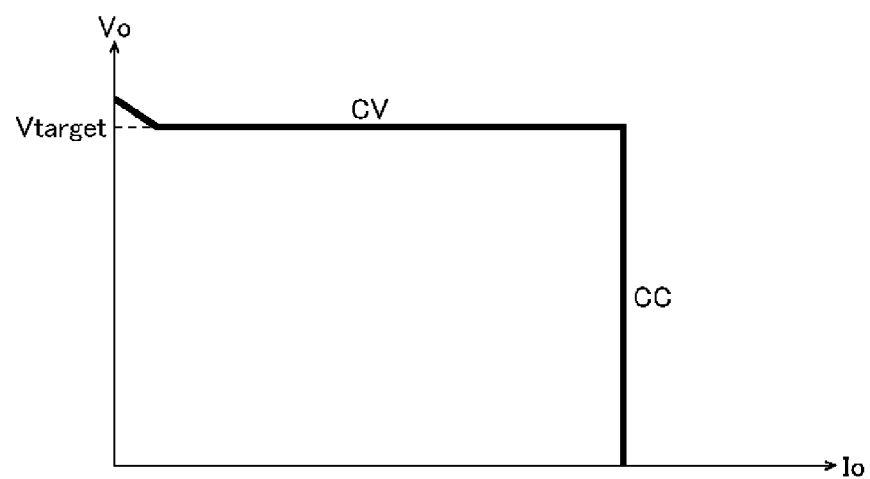
FIG. 10 is a view showing a first problem (output rise during a light load time).

FIG. 10 is a view showing a first problem (output rise during the light load time). The insulation type switching power source apparatus 1 according to the second embodiment has the signal delay portion 229b (timer) as a return device from the burst mode to the usual mode, and every time the predetermined burst duration Tbst elapses, the return from the burst mode to the usual mode is performed irrespective of the output state. Because of this, there is a case where the output switch 227 is turned on/off unnecessarily and the output voltage Vo becomes higher than the target voltage Vtarget.

In the meantime, to avoid such an output characteristic deterioration, for example, it is conceivable that a dummy resistor is connected in parallel with the load Z to make an intentional power loss occur. However, according to such method, it becomes impossible to achieve both reduction in power consumption (standby power) during the light load time and improvement in the output characteristic, which cannot be said to be an optimum measure.

Figure 11:
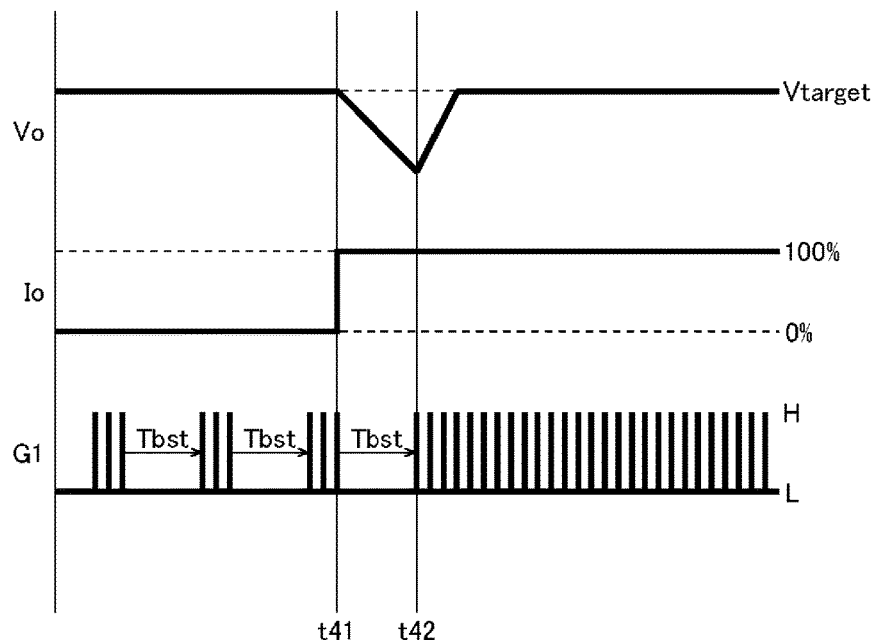
FIG. 11 is a view showing a second problem (output decline at a sharp load change).

FIG. 11 is a timing chart showing a second problem (output drop at a sharp load change), and illustrates, from top in order, the output voltage Vo, the output current Io, and the gate signal G1. As described above, the insulation type switching power source apparatus 1 according to the second embodiment temporarily stops the driving of the primary winding 11 upon detecting the light load state, thereafter, resumes the driving of the primary winding 11 upon the elapse of the burst duration Tbst.

In other words, after shifting once to the burst mode, the insulation type switching power source apparatus 1 according to the second embodiment never returns to the usual mode until the burst duration Tbst elapses no matter how the light load state changes. Because of this, if a sharp change (e.g., from 0% to 100%) in the load occurs during the burst mode, the return to the usual mode delays and the drop in the output voltage Vo becomes large. In the meantime, FIG. 11 illustrates the worst case where the output current Io sharply increases immediately after shifting to the burst mode at a time point t41; as a result of this, the output voltage Vo drops dramatically until a time point t42 when the burst duration Tbst elapses.

A drop amount of the output voltage Vo is decided by a length of the burst duration Tbst besides a capacitance value of the capacitor 62 and an electric current value of the output current Io. The shorter the burst duration Tbst is set, the higher the load response characteristic is raised; however, reversely, the efficiency in the light load state drops.

Considering the above study, the insulation type switching power source apparatus 1 according to the second embodiment is preferable to a set (up to 10 W) that does not put a weight on the output characteristic, and a further improvement is desirable in a case of being applied to a set (up to 80 W) that puts a weight on the characteristics and used for a large power.

Third Embodiment

Figure 12:
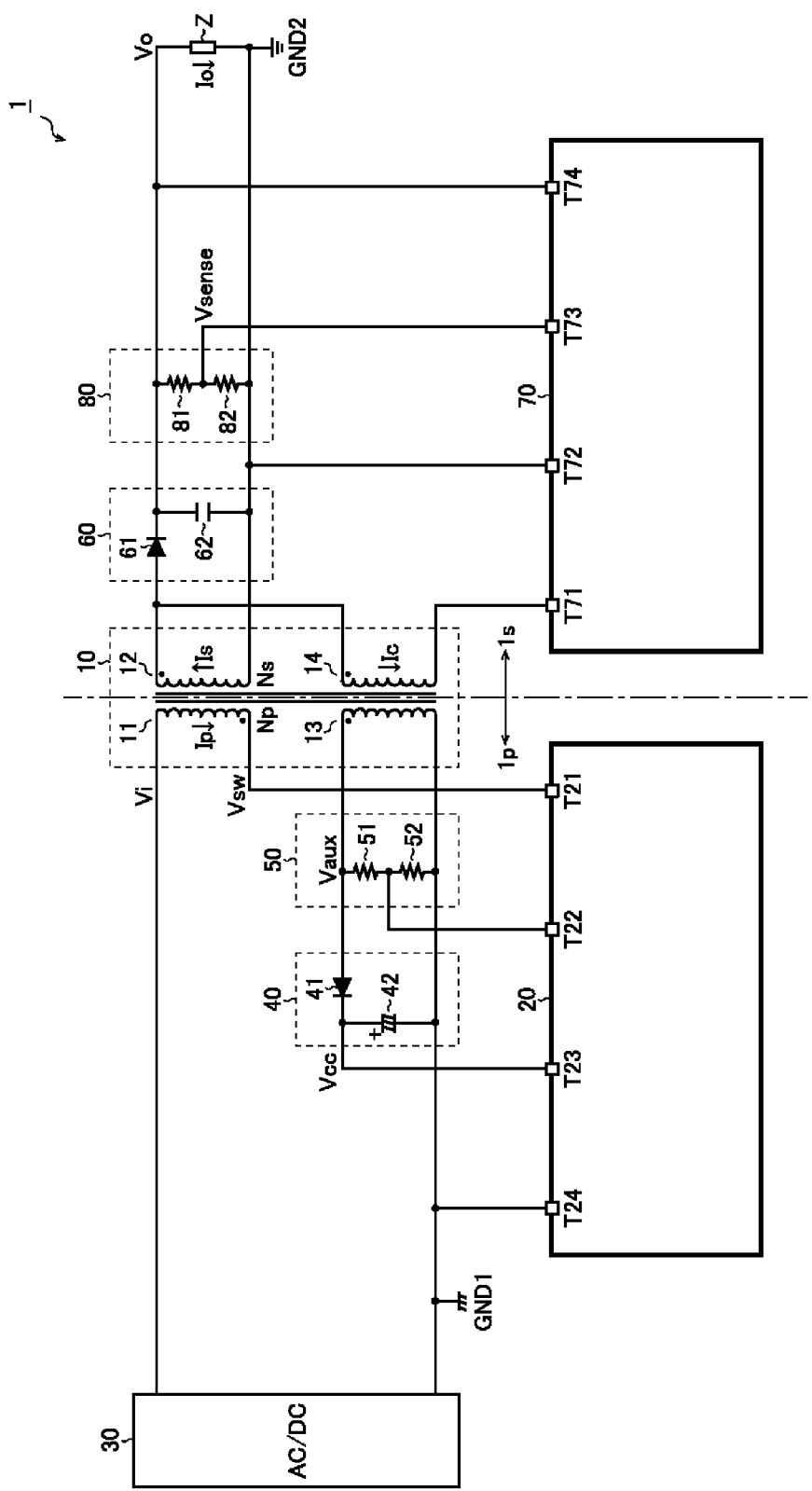
FIG. 12 is a view showing a third embodiment of an insulation type switching power source apparatus.

FIG. 12 is a view showing a third embodiment of the insulation type switching power source apparatus. The insulation type switching power source apparatus 1 according to the third embodiment has basically the same structure as the second embodiment, and has a feature that a semiconductor device 70 for monitoring the output voltage Vo is added as a device for solving the above-described problems. Accordingly, the same components as the first embodiment and the second embodiment are indicated by the same signs as FIG. 1 to skip double description of them, and hereinafter, the feature portion of the third embodiment is mainly described.

The insulation type switching power source apparatus 1 according to the third embodiment has the semiconductor device 70 and a monitor voltage generation portion 80 besides the components 10 to 60 shown in FIG. 1.

The semiconductor device 70 is an output monitor IC that is disposed in the secondary circuit system is to monitor the output voltage Vo. The semiconductor device 70 has external terminals T71 to T74 as devices for establishing electric connection with outside of the device. The external terminal T71 (SW pin) is connected to the transformer 10 (second auxiliary winding 14 described later). The external terminal T72 (GND pin) is connected to the ground terminal GND2. The external terminal T73 (VSENSE pin) is connected to an output terminal (application terminal for the monitor voltage Vsense) of the monitor voltage generation portion 80. The external terminal T74 (VCC pin) is connected to the application terminal for the output voltage Vo. In the meantime, an internal structure and operation of the semiconductor device 70 are described in detail later.

The monitor voltage generation portion 80 includes resistors 81 and 82 connected in series between the application terminal for the output voltage Vo and the ground terminal GND2, divides the output voltage Vo to generate the monitor voltage Vsense, and applies the monitor voltage to the external terminal T73 of the semiconductor device 70. The higher the output voltage Vo is, the higher the monitor voltage Vsense becomes. Reversely, the lower the output voltage Vo is, the lower the monitor voltage Vsense becomes. As described above, the monitor voltage Vsense changes in accordance with the output voltage Vo.

Besides, in the insulation type switching power source apparatus 1 according to the third embodiment, to establish a signal transmission route from the semiconductor device 70 to the semiconductor device 20 without using a photocoupler, the transformer 10 also is modified. More specifically, the transformer 10 includes the second auxiliary winding 14 disposed in the secondary circuit system is besides the primary winding 11, the secondary winding 12, and the first auxiliary winding 13. A first terminal of the second auxiliary winding 14 is connected to the first terminal of the secondary winding 12. A second terminal of the second auxiliary winding 14 is connected to the external terminal T71 of the semiconductor device 70.

If the semiconductor device 70 flows a drive current Ic to the second auxiliary winding 14, the induced voltage Vaux occurs in the first auxiliary winding 13 that is magnetically connected to the second auxiliary winding 14 with the same polarity. In the meantime, the number of turns of the second auxiliary winding 14 may be arbitrarily adjusted such that the induced voltage Vaux becomes a desired value.

After detecting the light load state and shifting to the burst node, the semiconductor device 20 detects the induced voltage Vaux appearing in the first auxiliary winding 13 to return to the usual mode. A circuit for achieving such operation mode shift is added to the semiconductor device 20, which is described in detail later.

Figure 13:
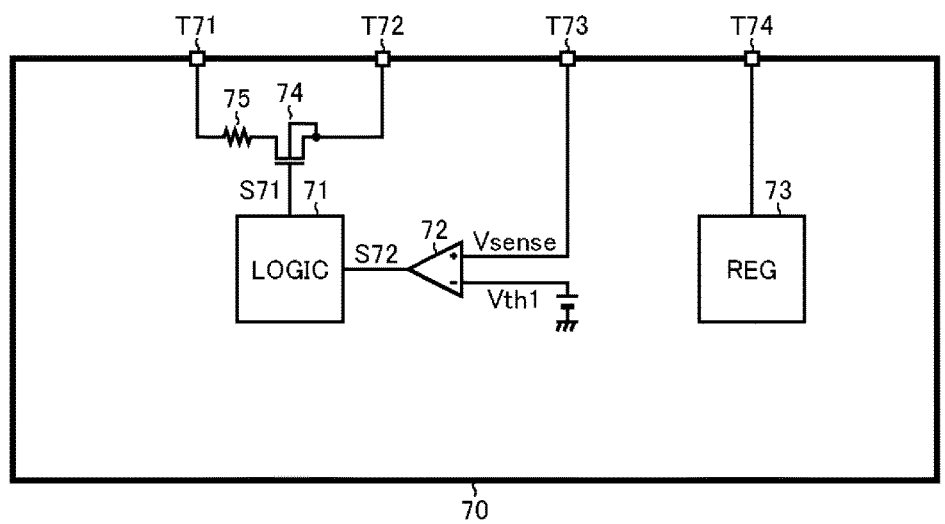
FIG. 13 is a block diagram showing a structural example of an output monitor device.

FIG. 13 is a block diagram showing a structural example of the semiconductor device 70. The semiconductor device 70 integrates therein: a logic portion 71; a comparator 72; a regulator 73; an N channel type MOS field effect transistor 74; and a resistor 75.

The logic portion 71 generates a gate signal S71 for the transistor 74 in accordance with an output monitor signal S72. More specifically, the logic portion 71 keeps the gate signal S71 at a high level for a predetermined on-duration $\Delta Ton1$ (where $\Delta Ton1 > Tosc$, e.g., $\Delta Ton1 = 100$ μs) after the output monitor signal S72 falls.

The comparator 72 compares the monitor voltage Vsense applied to a non-inverting input terminal (+) with a threshold value voltage Vth1 applied to an inverting input terminal (−) to generate the output monitor signal S72. The output monitor signal S72 goes to a high level when the monitor voltage Vsense is higher than the threshold value voltage Vth1, and goes to a low level when the monitor voltage Vsense is lower than the threshold value voltage Vth1.

The regulator 73 generates a desired internal power source voltage from the output voltage Vo and supplies the generated voltage to each portion (logic portion 71 and the like) of the semiconductor device 70.

A drain of the transistor 74 is connected to the external terminal T71 (second terminal of the second auxiliary winding 14) via the resistor 75. Both a source and a back gate of the transistor 74 are connected to the external terminal T72 (ground terminal GND2). A gate of the transistor 74 is connected to the logic portion 71. When the gate signal S71b is at the high level, the transistor 74 is turned on and the drive current Ic flows in the second auxiliary winding 14.

Figure 14:
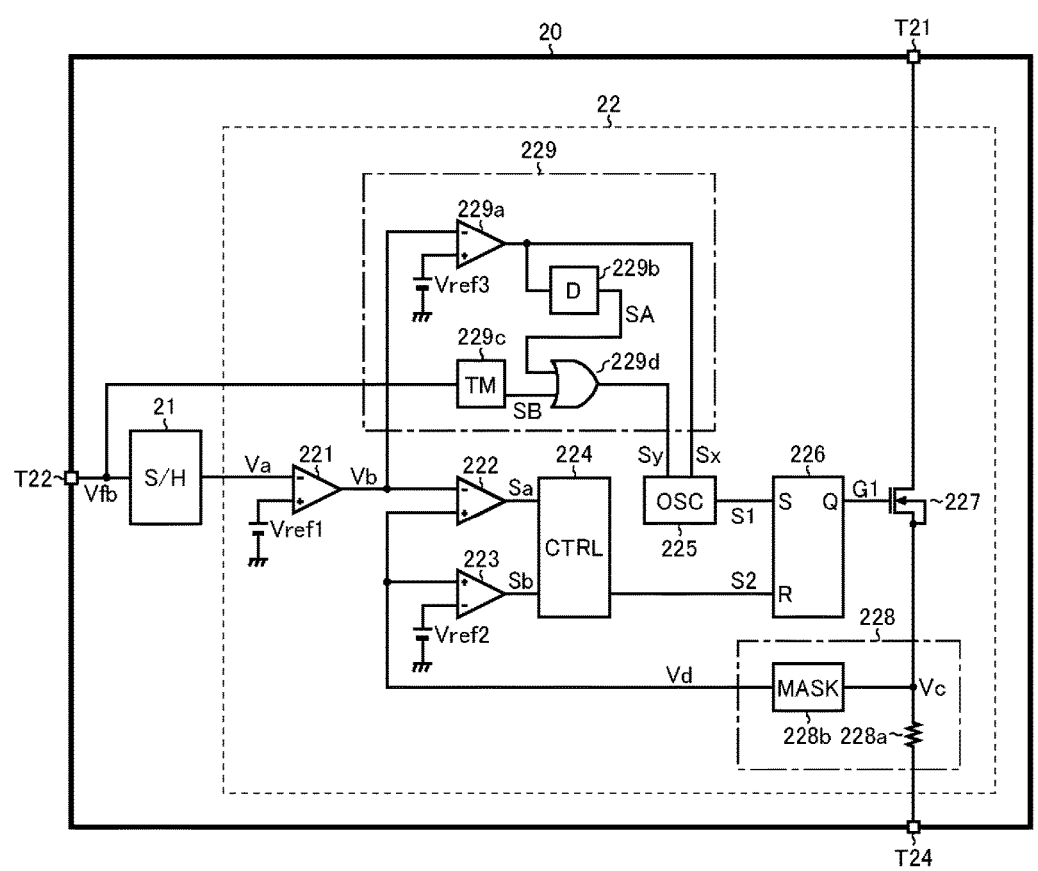
FIG. 14 is a block diagram showing a structural example of a switching control device.

FIG. 14 is a block diagram showing a structural example of the semiconductor device 20. The semiconductor device 20 in the present structural example is substantially the same as the above second embodiment, and has a feature that the burst control portion 229 is modified. Accordingly, the same components as the second embodiment are indicated by the same signs as FIG. 8 to skip double description of them, and hereinafter, the feature portion of the present structural example is mainly described.

The burst control portion 229 in the present structural example includes a timing signal generation portion 229c and an OR gate 229d besides the above comparator 229a and signal delay portion 229b.

The timing signal generation portion 229c monitors the feedback voltage Vfb to generate a timing signal SB. More specifically, when the feedback voltage Vfb is kept at a high level for a predetermined on-duration ΔTon2 (where Tosc<ΔTon2<ΔTon1, e.g., ΔTon2=50 μs), the timing signal generation portion 229c sets a high level trigger pulse in the timing signal SB.

The OD gate 229d calculates a logical sum of a delay signal SA (=signal obtained by giving a predetermined delay to the drive stop signal Sx) generated by the signal delay portion 229b and the timing signal SB generated by the timing signal generation portion 229c, thereby generating a drive start signal Sy. The drive start signal Sy goes to a high level when at least one of the delay signal SA and the timing signal SB is at a high level, and goes to a low level when both the delay signal SA and the timing signal SB are at a low level.

In the meantime, the burst control portion 229 in the present structural example has the structure that includes the signal delay portion 229b and the OR gate 229d to be also applicable to a system (second embodiment) in which the semiconductor device 70 is not disposed in the secondary circuit system 1s. However, in a case where it is decided that the semiconductor device 20 and the semiconductor device 70 are always paired and used, a structure may be used, in which the signal delay portion 229b and the OR gate 229d are removed and the timing signal SB is output as the drive start signal Sy.

Figure 15:
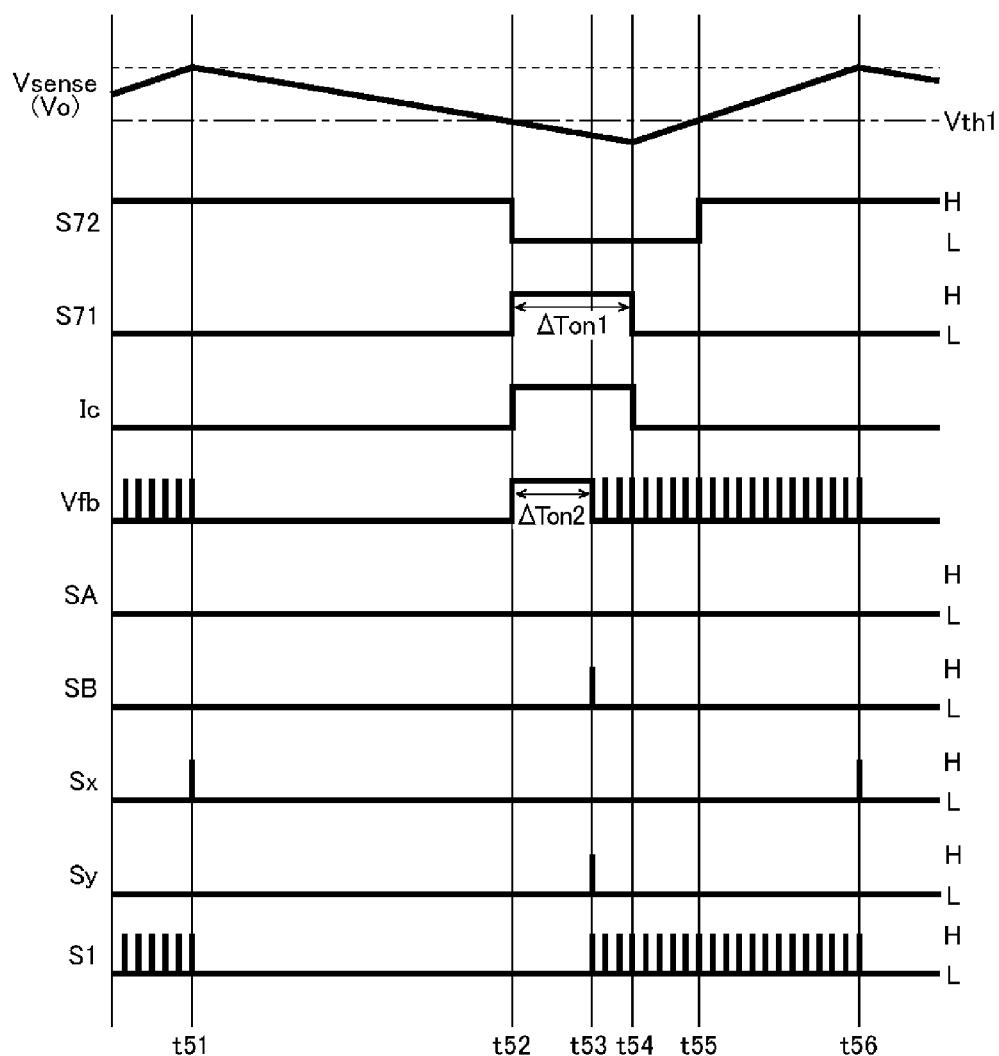
FIG. 15 is a timing chart showing a return operation from a burst mode.

FIG. 15 is a timing chart showing the return operation from the burst mode, and illustrates, from top in order, the monitor voltage Vsense (which corresponds to the output voltage Vo); the output monitor signal S72; the gate signal S71; the drive current Ic; the feedback voltage Vfb; the delay signal SA; the timing signal SB; the drive stop signal Sx; the drive start signal Sy; and the on-signal S1.

At a time point t51, if the drive stop signal Sx rises to a high level, the insulation type switching power source apparatus 1 shifts to the burst mode in which the oscillation of the on-signal S1 is stopped temporarily. After shifting to the burst mode, the output voltage Vo drops gradually; accordingly, following this, also the monitor voltage Vsense drops gradually. However, at this time point, the monitor voltage Vsense is higher than the threshold value voltage Vth1; accordingly, the output monitor signal S72 is at the high level, and the gate signal S71 is kept at the low level. Accordingly, the transistor 74 is turned off; therefore, the drive current Ic does not flow in the second auxiliary winding 14. Besides, in the burst mode, the feedback voltage Vfb goes to a low level.

As a result of that the output voltage Vo drops further, at a time point t52, if the monitor voltage Vsense becomes lower than the threshold value voltage Vth1 earlier than the timing (timing when the burst duration Tbst elapses after the time point t51) when the delay signal SA rises to the high level, the output monitor signal S72 falls to the low level, and hereinafter, the gate signal S71 is kept at the high level for the on-duration ΔTon1 (duration of the time points t52 to t54). During this duration, the transistor 74 is turned on and the drive current Ic flows in the second auxiliary winding 14; accordingly, in the primary circuit system 1p, the induced voltage Vaux (and the feedback voltage Vfb) are continuously generated for the on-duration ΔTon1.

Thereafter, in the semiconductor device 20, if it is confirmed that the feedback voltage Vfb is continuously generated for the on-duration ΔTon2 (duration of the time points t52 to t53), a trigger pulse is set in the timing signal SB. As a result of this, the drive start signal Sy rises to the high level; accordingly, the oscillation of the on-signal S1 is resumed and the insulation type switching power source apparatus 1 returns to the usual mode.

Also after the time point t54, the basically same operation as the above operation is repeated, whereby the shift to the burst mode and the return to the usual mode are performed. In the meantime, in FIG. 15, during the driving of the second auxiliary winding 14, the transistor 74 is kept at the on-state for the on-duration ΔTon1; however, if reduction in the power consumption is prioritized, the transistor 74 may be pulse-driven for the on-duration ΔTon1.

As describe above, in the insulation type switching power source apparatus 1 according to the third embodiment, when the monitor voltage Vsense becomes lower than the threshold value voltage Vth1, the semiconductor device 70 (which corresponds to the output monitor device) drives the second auxiliary winding 14 to generate the induced voltage Vaux in the first auxiliary winding 13. Besides, upon detecting the light load state, the semiconductor device 20 (which corresponds to the switching control device) stops temporarily the driving of the primary winding 11 to shift to the burst mode, and upon detecting the induced voltage Vaux of the first auxiliary winding 13, resumes the driving of the primary winding 11 to return to the usual mode.

By employing such structure, it is possible to perform the return from the burst mode to the usual mode at an optimum timing in accordance with the output state (load state) of the secondary circuit system 1s; accordingly, it becomes possible to improve the output characteristic in the light load state and curb the drop in the output voltage Vo at the sharp load change.

FIG. 16 is a comparison table of systems. The SSR system has advantages of ⊚ very good load regulation, and ⊚ very wide range applicable to a set, but on the other hand, has disadvantages of × photocoupler required, × large standby power, and × a large number of components.

Besides, the PSR system (which corresponds to the second embodiment) has advantages of ○ no photocoupler required, ○ small standby power, ○ a very small number of components, and preferable to a set (up to 10 W) that does not put a weight on the output characteristic, however, still has room for further improvement in Δ somewhat poor load regulation, and somewhat narrow range applicable to a set.

On the other hand, the PSR+CommIC (which corresponds to the third embodiment) has advantages of ○ no photocoupler required, ○ good load regulation, ○ small standby power, ○ a small number of components, and ○ wide range applicable to a set, namely, is a very well-balanced system that solves the problems with the PSR system.

Figure 17:
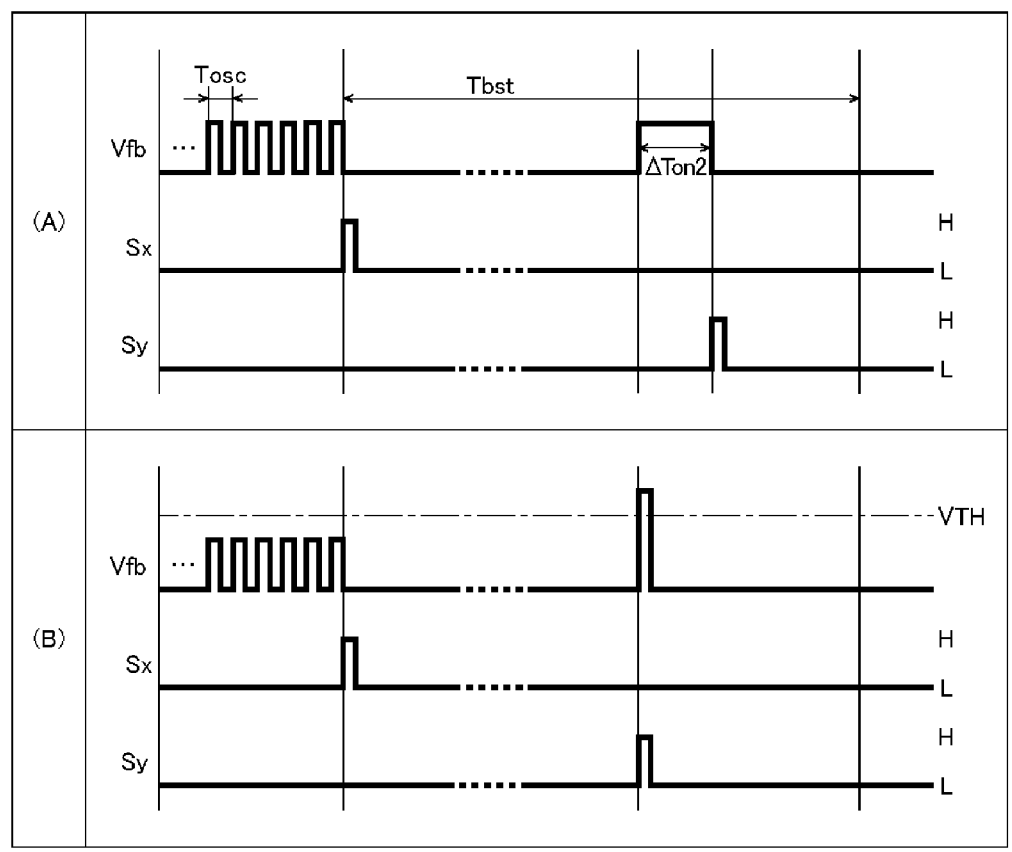
FIG. 17 is a table showing variations of a return operation.

FIG. 17 is a table showing variations of the return operation, and an (A) box and a (B) box of which each illustrate, from top in order, the feedback voltage Vfb, the drive stop signal Sx,a and the drive start signal Sy.

The return operation in the (A) box is the same as FIG. 15 described above, in which when detecting and determining the induced voltage Vaux by the semiconductor device 20, it is monitored whether the feedback voltage Vfb (and the induced voltage Vaux) continuously occur for the predetermined on-duration ΔTon2 or not.

On the other hand, in the return operation in the (B) box, when detecting and determining the induced voltage Vaux, it is monitored whether the induced voltage Vaux (and the feedback voltage Vfb) higher than the voltage in the usual driving of the primary winding 11 occur or not. According to such return operation, it is possible to return from the burst mode to the usual mode without awaiting the elapse of the on-duration ΔTon2; accordingly, it becomes possible to further improve the response characteristic at the sharp load change. In the meantime, to perform the return operation, it is necessary to adjust the number of turns of the second auxiliary winding 14 such that the feedback voltage Vfb higher than a predetermined threshold value voltage VTH (voltage value which the feedback voltage Vfb occurring during the usual drive time of the primary winding 11 never exceeds) occurs when the second auxiliary winding 14 is driven by using the semiconductor device 70.

Fourth Embodiment

Figure 18:
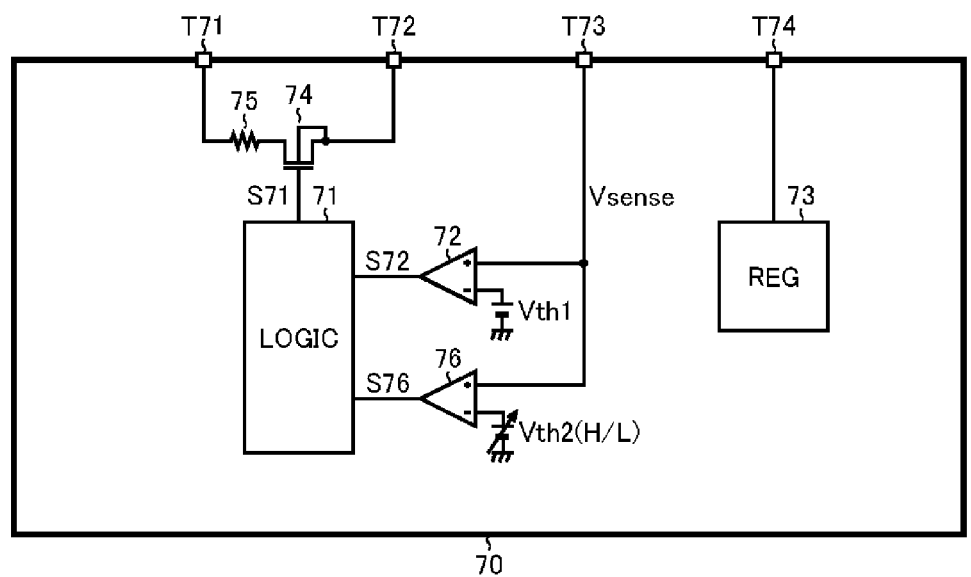
FIG. 18 is a view showing a fourth embodiment of an insulation type switching power source apparatus.

FIG. 18 is a view showing a fourth embodiment (only the semiconductor device 70 is illustrated) of the insulation type switching power source apparatus. The insulation type switching power source apparatus 1 according to the fourth embodiment has basically the same as the third embodiment, and has a feature that an under-voltage-condition detection comparator 76 is integrated in the semiconductor device 70. Accordingly, the same components as the third embodiment are indicated by the same signs as FIG. 13 to skip double description of them, and hereinafter, the comparator 76, which is the feature portion of the fourth embodiment, is mainly described.

The comparator 76 compares the monitor voltage Vsense applied to a non-inverting input terminal (+) with an under-voltage-condition lifting voltage Vth2H and an under-voltage-condition detection voltage Vth2L (where Vth2L<Vth1<Vth2H) that are selectively applied to an inverting input terminal (−) to generate an UVLO [under voltage locked out] signal S76. The UVLO signal S76 goes to a high level when the monitor voltage Vsense becomes higher than the under-voltage-condition lifting voltage Vth2H, and goes to a low level when the monitor voltage Vsense becomes lower than the under-voltage-condition detection voltage Vth2L.

The logic portion 71 performs control to or not to drive the transistor 74 in accordance with the UVLO signal S76. More specifically, the logic portion 71 fixes the gate signal S71 at the low level irrespective of the logic level of the output monitor signal S72 if the UVLO signal S76 is at a low level (logic level at a time of detecting under-voltage-condition), and as described above, raises the gate signal S71 to the high level by using a falling edge of the output monitor signal S72 as a trigger if the UVLO signal S76 is at a high level (logic level at a time of lifting the under-voltage-condition).

Figure 19:
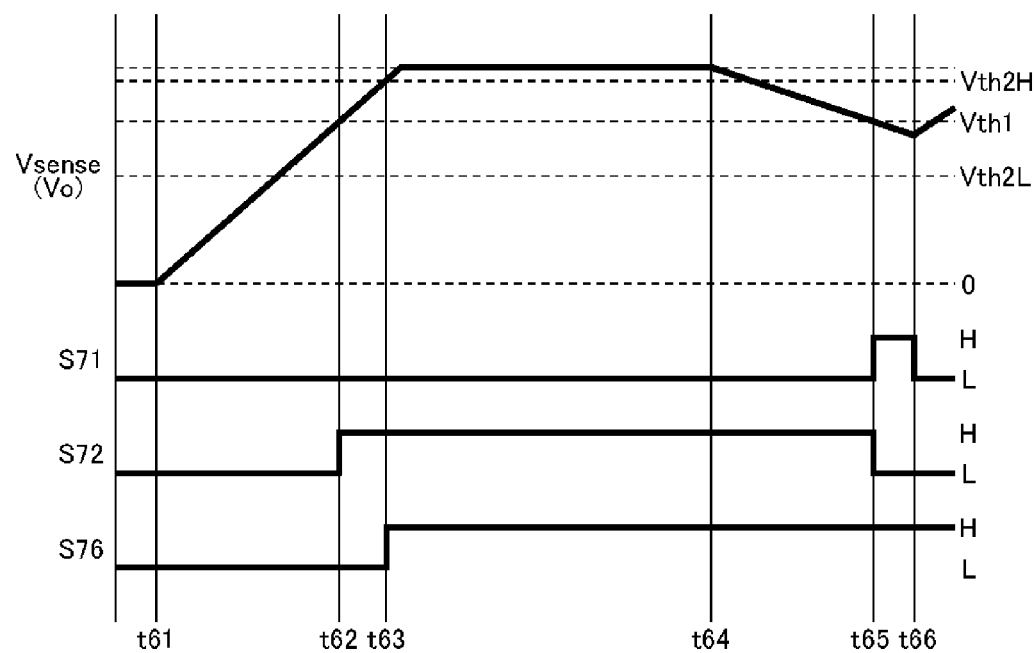
FIG. 19 is a timing chart showing an example of a startup operation.

FIG. 19 is a timing chart showing an example of the startup operation of the insulation type switching power source apparatus 1, and illustrate, from top in order, the monitor voltage Vsense (which corresponds to the output voltage Vo), the gate signal S71, the output monitor signal S72, and the UVLO signal S76.

At a time point t61, if the insulation type switching power source apparatus 1 starts up, as the output voltage Vo rises, also the monitor voltage Vsense rises. At this time, the monitor voltage Vsense is lower than the threshold value voltage Vth1; accordingly, the output monitor signal S72 goes to the low level. However, at this time point, the monitor voltage Vsense is lower than the under-voltage-condition lifting voltage Vth2H and the UVLO signal S76 is at the low level; accordingly, the gate signal S71 is never raised to the high level in accordance with the low-level output monitor signal S72.

At a time point t62, if the monitor voltage Vsense becomes higher than the threshold value voltage Vth1, the output monitor signal S72 rises to the high level. However, even at this time point, the monitor voltage Vsense is lower than the under-voltage-condition lifting voltage Vth2H; accordingly, the UVLO signal S76 is kept at the low level, and the driving of the transistor 74 is kept prohibited.

At a time point t63, if the monitor voltage Vsense becomes higher than the under-voltage-condition lifting voltage Vth2H, the UVLO signal S76 rises to the high level. Accordingly, after the time point t63, the driving of the transistor 76 is permitted.

At a time point t64, if the insulation type switching power source apparatus 1 shifts to the burst mode, as the output voltage Vo drops, also the monitor voltage Vsense drops. However, at this time point, the monitor voltage Vsense is higher than the threshold value voltage Vth1; accordingly, the output monitor signal S72 is kept at the high level.

At a time point t65, if the monitor voltage Vsense becomes lower than the threshold value voltage Vth1, the output monitor signal S72 falls to the low level. As a result of this, the gate signal S71 is kept at the high level for a duration (which corresponds to the above on-duration ΔTon1) of the time points t65 to t66, and the drive current Ic is flowed into the second auxiliary winding 14.

As described above, in the insulation type switching power source apparatus 1 according to the fourth embodiment, after starting up, the semiconductor device 70 prohibits the driving of the second auxiliary winding 14 until the monitor voltage Vsense (which corresponds to the output voltage Vo) becomes higher than the under-voltage-condition lifting voltage Vth2H. According to such structure, it becomes possible to reduce power consumption at the startup time and quickly raise the output voltage Vo.

<Uses>

Uses of the insulation type switching power source apparatus 1 are described. The insulation type switching power source apparatus 1 is preferably used for power source blocks of an AC adapter and an electronic apparatus.

Figure 20:
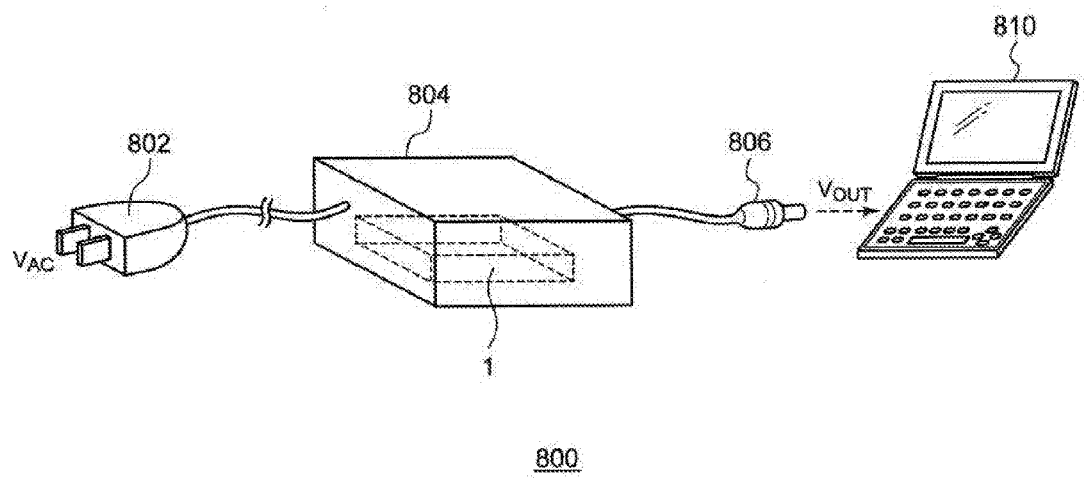
FIG. 20 is a view showing a structural example of an AC adapter that comprises an insulation type switching power source apparatus.

FIG. 20 is a view showing a structural example of an AC adapter that comprises the insulation type switching power source apparatus. The AC adapter 800 comprises a plug 802, a housing 804, and a connector 806. The plug 802 is supplied with a commercial a.c. voltage VAC (which corresponds to the a.c. voltage Vac of FIG. 1) from a not-shown outlet. The insulation type switching power source apparatus 1 is mounted in the housing 804. An output voltage VOUT (which corresponds to the output voltage Vo of FIG. 1) generated by the insulation type switching power source apparatus 1 is supplied from the connector 806 to an electronic apparatus 810. As the electronic apparatus 801, there are, for example, a notebook-sized PC, a digital still camera, a digital video camera, a mobile phone, a mobile audio layer and the like.

Figure 21:
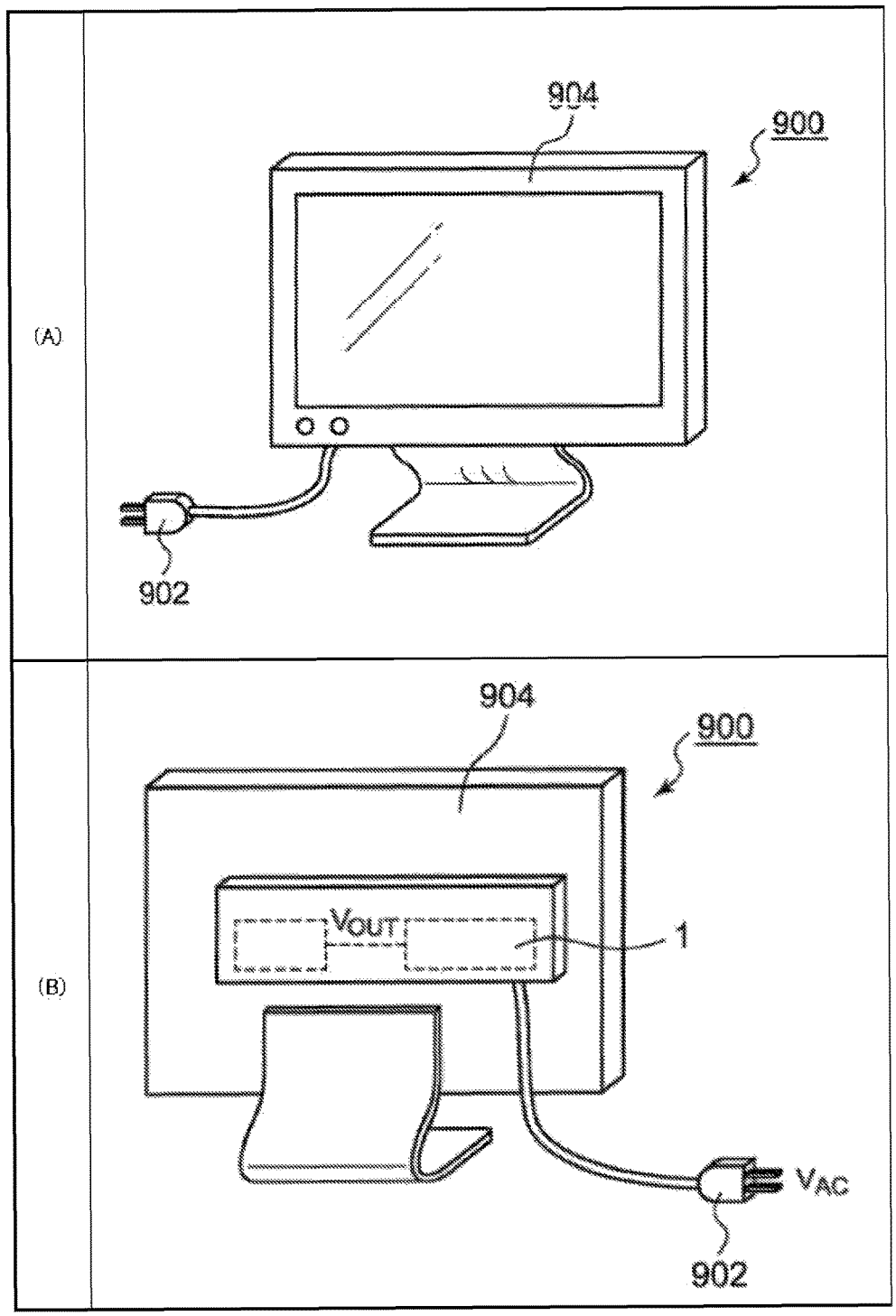
FIG. 21 is a view showing a structural example of an electronic apparatus that comprises an insulation type switching power source apparatus.

FIG. 21 is a view showing a structural example of an electronic apparatus that comprises the insulation type switching power source apparatus. In the meantime, an (A) box in the figure illustrates a front view of an electronic apparatus 900, and a (B) box in the figure illustrates a rear view of the electronic apparatus 900. In the meantime, the electronic apparatus 900 shown as an example in the figure is a display apparatus; however, the kind of the electronic apparatus 900 is not limited, but may be an electronic apparatus such as audio apparatus, a refrigerator, a washing machine, a cleaner or the like that incorporates a power source apparatus.

A plug 902 is supplied with the commercial a.c. voltage VAC (which corresponds to the a.c. voltage Vac of FIG. 1) from a not-shown outlet. The insulation type switching power source apparatus 1 is mounted in a housing 904. The output voltage VOUT (which corresponds to the output voltage Vo of FIG. 1) generated by the insulation type switching power source apparatus 1 is supplied to loads (microcomputer, DSP [digital signal processor], power source circuit, illumination device, analog circuit, digital circuit and the like) that are incorporated in the housing 904.

<Other Modifications>

Besides the above embodiments, it is possible to add various modifications to the structure of the present invention without departing from the spirit of the present invention. In other words, it should be considered that the above embodiments are examples in all respects and are not limiting. It should be understood that the technical scope of the present invention is not indicated by the above description of the embodiments but by the claims, and all modifications within the scope of the claims and the meaning equivalent to the claims are covered.

INDUSTRIAL APPLICABILITY

The present invention is usable for insulation type switching power source apparatuses that are used in all fields (home appliance field, car field, industrial machine field and the like).

LIST OF REFERENCE NUMERALS 1 insulation type switching power source apparatus
1p primary circuit system (GND1 system)
1s secondary circuit system (GND2 system)
10 transformer
11 primary winding
12 secondary winding
13 first auxiliary winding
14 second auxiliary winding
20 semiconductor device (switching control IC)
21 sample/hold circuit
211 comparator
212 timing generator
213 sample/hold portion
214 difference process portion
215 comparison process portion
216 control portion
217 selector
22 primary current control circuit
221 error amp
222, 223 comparators
224 controller
225 oscillator
226 RS flip-flop
227 output switch (N channel type MOS field effect transistor)
228 detection voltage generation portion
228a sense resistor
228b mask process
229 burst control portion
229a comparator
229b signal delay portion
229c timing signal generation portion
229d OR gate
30 AC/DC conversion portion
31 filter
32 diode bridge
33, 34 capacitors
40 power source voltage generation portion
41 diode
42 capacitor
50 feedback voltage generation portion
51, 52 resistors
60 rectifying-smoothing portion
61 diode
62 capacitor
70 semiconductor device (output monitor IC)
71 logic portion
72, 76 comparators
73 regulator
74 N channel type MOS field effect transistor
75 resistor
80 monitor voltage generation portion
81, 82 resistors
PW commercial a.c. power source
Z load
T21 to T24, T71 to T74 external terminals
SW11 to SW14 analog switches
C1 to C4 capacitors
N1 to N4 N channel type MOS field effect transistors
AMP1 to AMP3 electric current amps
R1 to R3 resistors
CMP1 to CMP3 comparators
800 AC adapter
802 plug
804 housing
806 connector
900 electronic apparatus
902 plug
904 housing

What is claimed is:

1. An insulation type switching power source apparatus comprising:
  a sample/hold circuit that samples/holds a feedback voltage, which is generated by using an auxiliary winding or a primary winding of a transformer, to generate a holding voltage, and
  a primary current control circuit that controls, in accordance with the holding voltage, a primary current that flows in the primary winding,
  wherein the sample/hold circuit counts a feedback voltage keeping duration from a time when the primary current is interrupted to a time when the feedback voltage becomes smaller than a threshold voltage, and based on a result of the counting, samples/holds the feedback voltage near an end of the feedback voltage keeping duration,
  wherein the sample/hold circuit repeats the sample/hold of the feedback voltage by a plurality of times to compare respective hold values with one another, and based on a result of the comparison, selects one of the hold values as the holding voltage, and wherein the sample/hold circuit detects whether a difference value between adjacent hold values is larger than a threshold value drop size or not, and based on a result of the detection, selects, as the holding voltage, a hold value immediately before the feedback voltage starts to decrease sharply.

2. The insulation type switching power source apparatus according to claim 1, wherein when all the difference values between the adjacent hold values are smaller than the threshold value drop size, the sample/hold circuit selects a last hold value as the holding voltage.

3. The insulation type switching power source apparatus according to claim 1, wherein the primary current control circuit includes:
an error amplifier that generates an error voltage corresponding to a difference between the holding voltage and a first reference voltage,
a detection voltage generation portion that generates a detection voltage corresponding to the primary current,
a first comparator that compares the error voltage with the detection voltage to generate a first comparison signal,
a controller that generates a pulse in an off-signal in accordance with the first comparison signal,
an oscillator that generates a pulse in an on-signal at a predetermined frequency,
a flip-flop that generates an output control signal in accordance with the on-signal and the off-signal, and
an output switch that flows/interrupts the primary current in accordance with the output control signal.

4. The insulation type switching power source apparatus according to claim 3, wherein the primary current control circuit further includes a second comparator that compares the detection voltage with a second reference voltage to generate a second comparison signal, and when the primary current does not reach an upper limit value, the controller performs a constant voltage control corresponding to the first comparison signal, and when the primary current reaches the upper limit value, the controller performs a constant current control corresponding to the second comparison signal.

5. The insulation type switching power source apparatus according to claim 3, wherein the detection voltage generation portion includes a mask process portion that fixes the detection voltage at a zero value for a predetermined mask duration after the output switch is turned on.

6. The insulation type switching power source apparatus according to claim 1, further comprising:

the transformer in which an input voltage is applied to the primary winding, a rectifying-smoothing portion that generates an output voltage from an induced voltage which occurs in a secondary winding of the transformer, and a feedback voltage generation portion that generates the feedback voltage from an induced voltage that occurs in the auxiliary winding or primary winding of the transformer.

7. An electronic apparatus comprising:

the insulation type switching power source apparatus according to claim 1, and a load that is supplied with an output voltage from the insulation type switching power source apparatus to operate.

* * * * *